United States Patent [19]
Yaguchi

[11] Patent Number: 5,818,929
[45] Date of Patent: Oct. 6, 1998

[54] METHOD AND APPARATUS FOR DTMF DETECTION

[75] Inventor: Tatsuya Yaguchi, Yokohama, Japan

[73] Assignee: Canon Kabushiki Kaisha, Tokyo, Japan

[21] Appl. No.: 354,939

[22] Filed: Dec. 13, 1994

Related U.S. Application Data

[63] Continuation of Ser. No. 9,860, Jan. 26, 1993, abandoned.

[30] Foreign Application Priority Data

Jan. 29, 1992 [JP] Japan .................................. 4-013630

[51] Int. Cl.$^6$ ...................................................... H04M 1/50
[52] U.S. Cl. .......................... 379/418; 379/283; 379/351; 379/386
[58] Field of Search .................................... 379/386, 283, 379/282, 351, 418, 77; 370/110.3; 364/724.09, 724.1, 724.19

[56] References Cited

U.S. PATENT DOCUMENTS

| | | | |
|---|---|---|---|
| 4,085,295 | 4/1978 | Goto et al. ........................ | 379/386 X |
| 4,853,958 | 8/1989 | Rabipour et al. .................... | 379/283 X |
| 4,868,872 | 9/1989 | Roberts et al. ...................... | 379/283 X |
| 5,119,322 | 6/1992 | Stroobach ........................... | 364/724.09 |
| 5,214,693 | 5/1993 | Chujo ....................................... | 379/351 |
| 5,392,348 | 2/1995 | Park et al. .............................. | 379/386 |
| 5,408,529 | 4/1995 | Greaves ................................. | 379/386 |

*Primary Examiner*—Ahmad F. Matar
*Assistant Examiner*—Jacques M. Saint-Surin
*Attorney, Agent, or Firm*—Morgan & Finnegan LLP

[57] ABSTRACT

The total energy of a signal that has entered from a telephone line is detected before the signal is applied to an AGC circuit. After the signal is applied to the AGC circuit, the energy of a DTMF signal, which comprises one frequency from four high group frequencies and one frequency from four low group frequencies, is detected through a band-elimination filter having a short energy-propagation delay time with respect to pass-band frequencies. By detecting the DTMF signal based upon the detected energies, detection of the DTMF signal can be performed in a short period of time and erroneous detection can be suppressed.

17 Claims, 28 Drawing Sheets

METHOD AND APPARATUS FOR DTMF DETECTION

This is a continuation of application Ser. No. 08/009,860, filed on Jan. 26, 1993, now abandoned.

BACKGROUND OF THE INVENTION

This invention relates to a method and apparatus for DTMF detection in a DTMF system that transmits information using combinations of tone signals having two different frequencies.

In order to transmit information using combinations of tone signals having two different frequencies, the specifications of a DTMF signaling are determined in advance, as shown below, in conformity with technical standards.

TABLE 1

| TYPE OF SIGNAL | SIGNAL FREQUENCIES |
|---|---|
| 1 | 697 and 1209 Hz |
| 2 | 697 and 1336 Hz |
| 3 | 697 and 1477 Hz |
| 4 | 770 and 1209 Hz |
| 5 | 770 and 1336 Hz |
| 6 | 770 and 1477 Hz |
| 7 | 852 and 1209 Hz |
| 8 | 852 and 1336 Hz |
| 9 | 852 and 1477 Hz |
| 0 | 941 and 1336 Hz |
| * | 941 and 1209 Hz |
| # | 941 and 1477 Hz |
| A | 697 and 1633 Hz |
| B | 770 and 1633 Hz |
| C | 852 and 1633 Hz |
| D | 941 and 1633 Hz |

TABLE 2

| ITEM | ALLOWABLE LIMITS |
|---|---|
| SIGNAL FREQUENCY DEVIATION | SIGNAL FREQUENCY ± 1.5% |
| LOW GROUP FREQUENCY SIGNAL TRANSMISSION LEVEL | (−9.5 ± 2.0) dBM |
| HIGH GROUP FREQUENCY | (−8.5 ± 2.0) dBM |
| SIGNAL TRANSMISSION TIME | NO LESS THAN 50 msec |
| MINIMUM PAUSE | NO LESS THAN 30 msec |
| PERIOD | NO LESS THAN 120 msec |

Table 1 shows signal frequency and composition, and Table 2 illustrates other specifications. Low-group frequencies refer to frequencies of 697 Hz, 770 Hz, 852 Hz and 941 Hz, the high-group frequencies refer to 1209 Hz, 1336 Hz, 1477 Hz and 1633 Hz.

The transmission of information using DTMF signals specified as set forth above has the shortcoming of low transmission speed, but advantages are that there is wide margin for line noise and a high degree of communication reliability. For this reason, such transmission is used for exchange selection signals and for control signals in facsimile multiple-address communication.

In a DTMF detector, a narrow-band band-pass filter is used in order to detect a DTMF signal. However, in the example of the prior art described above, the energy response of a narrow-band band-pass filter with respect to the sine wave of the center frequency is very slow, and therefore it is difficult to detect the DTMF with a high degree of accuracy.

Further, since the detection of the total energy present in a telephone line is performed at an AGC input unit and the detection of the energies of two different sine waves which constitute the DTMF signal is performed at an AGC output unit, the detection characteristics are influenced greatly by the value of the AGC time constant that decides the AGC response. More specifically, in a case where the shortest transmission time of a DTMF signal is 50 msec, as shown in Table 2, and the AGC response is slow, the DTMF signal cannot be detected within the shortest transmission time.

Furthermore, erroneous detection frequently occurs in a case where there is a large amplitude distortion caused by distortion in the subscriber line connecting a communication terminal and an exchange or by distortion ascribable to an FDM line.

SUMMARY OF THE INVENTION

Accordingly, an object of the present invention is to provide a DTMF detection method and apparatus in which detection of a DTMF signal can be performed in a short time and erroneous detection is suppressed.

According to the present invention, there is provided a DTMF detecting apparatus in a DTMF transmission system that transmits information using combinations of tone signals having two different frequencies, characterized by comprising first detecting means for detecting total energy of an input signal, second detecting means for detecting energy of the input signal through a filter having a short energy-propagation delay time with respect to a pass-band frequency, and third detecting means for detecting a DTMF signal based upon the energies detected by the first and second detecting means.

In the arrangement described above, the total energy of the input signal is detected and the energy of the input signal is detected through the filter having the short energy-propagation delay time with respect to a pass-band frequency. The apparatus operates so as to detect the DTMF signal based upon the energies detected.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the invention will now be described in detail with reference to the drawings.

First, an overview of a detector for detecting a DTMF signal will be described in detail.

Figure 9:
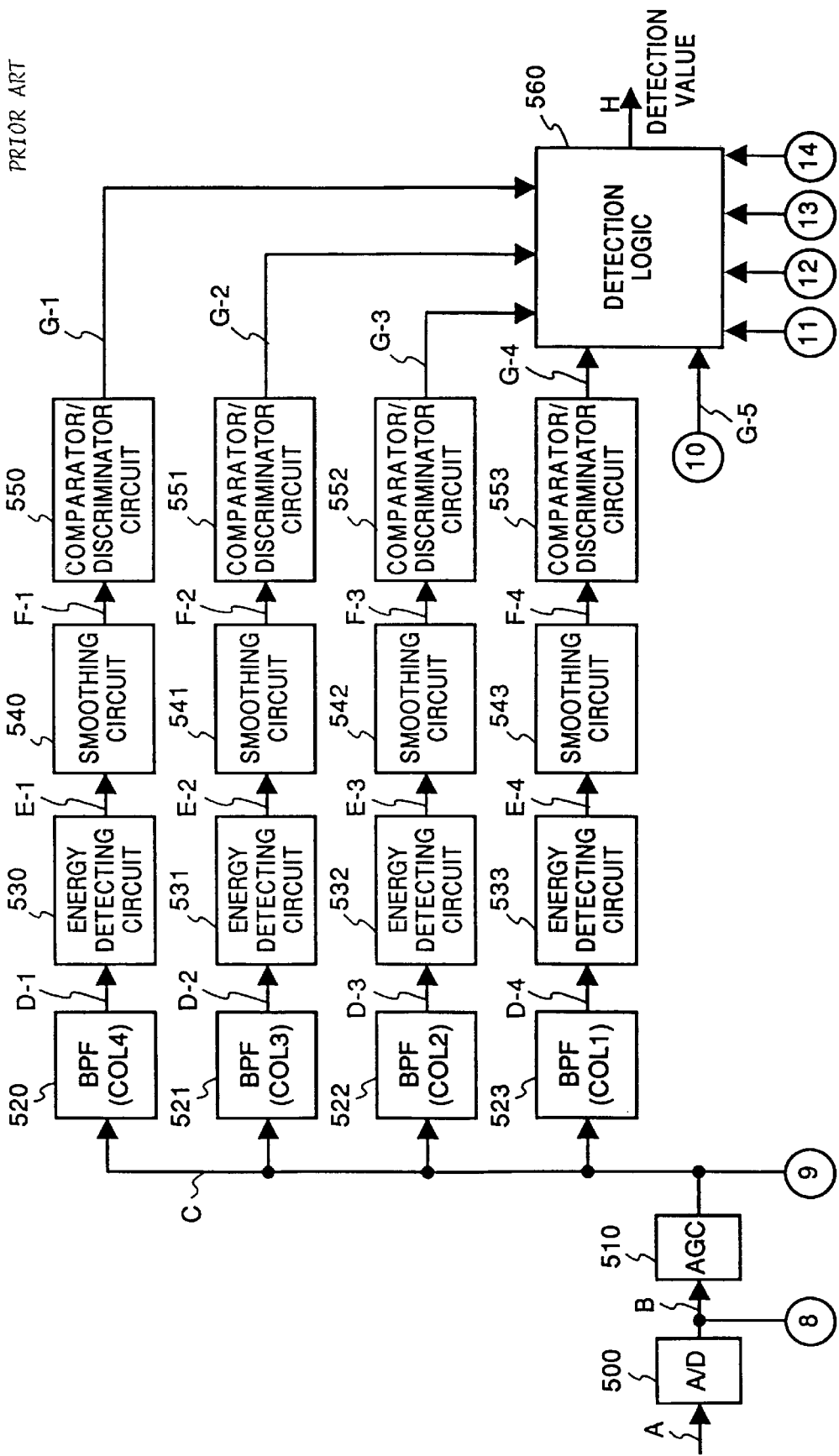
FIGS. 9 and 10 are block diagrams showing the circuitry of an ordinary DTMF detector.
Figure 10:
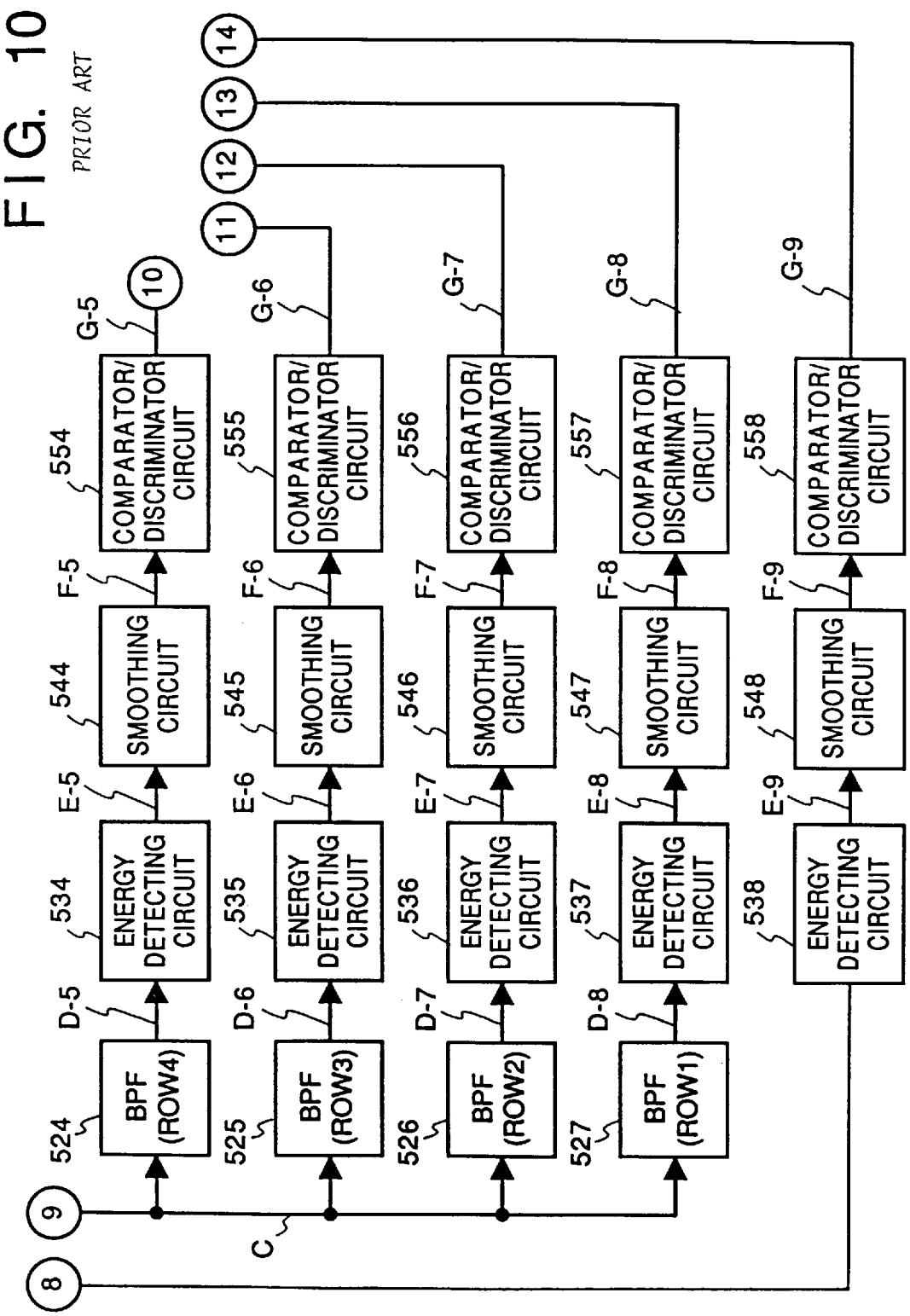

FIGS. 9 and 10 are block diagrams showing the construction of an ordinary DTMF signal detector. As shown in FIG. 9, an analog DTMF signal that has arrived from a telephone line (not shown) via a signal line A enters an A/D converter 500, where the signal is quantized. The resulting quantized DTMF signal is outputted to an AGC 510 and an energy detecting circuit 538, shown in FIG. 10, through a signal line B.

The circuitry relating to the path from the signal line B to the AGC 510 will be described first. The AGC 510 functions to change the level of the quantized DTMF signal, which changes every call or varies in a time series, to a fixed reference value that is easy to handle as far as the DTMF detector is concerned. The DTMF signal of a fixed level is inputted from a signal line C to high group frequency (1633 Hz, 1477 Hz, 1336 Hz, 1209 Hz) band-pass filters (BPF) 520~523 and, at the same time, to low group frequency (941 Hz, 852 Hz, 770 Hz, 697 Hz) band-pass filters (BPF) 524~527. The BPFs 520~527 are for detecting a DTMF signal comprising one frequency among the four high group frequencies and one frequency among the four low group frequencies. In order to detect the high group frequencies, the BPFs 520, 521, 522 and 523 are designed to have center frequencies of 1633 Hz, 1477 Hz, 1336 Hz and 1209 Hz, respectively. In order to detect the low group frequencies, the BPFs 524, 525, 526 and 527 are designed to have center frequencies of 941 Hz, 852 Hz, 770 Hz and 697 Hz, respectively.

Accordingly, when the DTMF signal arrives, the energies of the output of one of the four BPFs for high group frequency detection and of the output of one of the four BPFs for low group frequency detection corresponding to the high group frequencies and low group frequencies, respectively, which are the main frequency components of the DTMF signal, become larger relative to the energies of the other six BPF outputs.

Next, the signals filtered by the BPFs 520~527 enter respective energy detecting circuits 530~537 through corresponding signal lines D-1~D-8. The energy detecting circuits 530~537 extract the instantaneous energy components of signals and typically are squaring circuits, absolute-value circuits, etc. Output-signal lines E-1~E-8 of the energy detecting circuits 530~537 are connected to corresponding smoothing circuits 540~547, respectively. The instantaneous energy components are smoothened by the smoothing circuits 540~547, each of which is composed of a low-pass filter, etc.

The outputs of the smoothing circuits 540~547 are connected to comparator/discriminator circuits 550~557 by corresponding signal lines F-1~F-8, respectively. The comparator/discriminator circuits 550~557 compare reference threshold levels with the outputs of the corresponding smoothing circuits and output "1" when the output of the smoothing circuit is larger and "0" when the output of the smoothing circuit is smaller. Thus, the comparator/discriminator circuits 550~557 function to judge relative magnitude.

Figure 11:
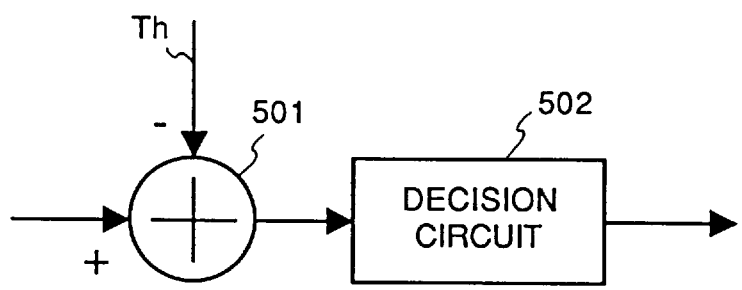
FIG. 11 is a block diagram showing the construction of an ordinary comparator/discriminator circuit.

FIG. 11 is a block diagram showing an example of a typical comparator/discriminator circuit. As shown in FIG. 11, a threshold level Th is subtracted from the input signal by an adder circuit 501. A discriminating circuit 502 outputs "1" if the result of addition is positive and "0" if the result is negative. The results of comparison and judgment outputted by the comparator/discriminator circuits 550~557 are delivered to detection logic 560 by signal lines G-1~G-8.

Described next will be the circuitry relating to the path from the signal line B to the energy detecting circuit 538 shown in FIG. 10. The inputted quantized DTMF signal has its instantaneous energy component extracted by the energy extracting circuit 538. Since the signal line B is connected directly to the energy detecting circuit 538 without the intermediary of the AGC, the instantaneous energy component extracted signifies the instantaneous absolute signal energy of the DTMF signal that arrives from the telephone line.

The energy detecting circuit 538 has an output signal line E-9 connected to a smoothing circuit 548, which is composed of a low-pass filter or the like to smoothen the instantaneous energy component. The output of the smoothing circuit 548 is connected to a comparator/discriminator circuit 558 by a signal line F-9. The comparator/discriminator circuit 558 compares a reference threshold level with the output of the smoothing circuit 548 and outputs "1" when the output of the smoothing circuit is larger and "0" when the output of the smoothing circuit is smaller. Thus, the comparator/discriminator circuit functions to judge relative magnitude. The threshold level used here usually has a value different from that of the threshold level used in the comparator/discriminator circuits 550~557. The threshold level selected often is one that allows the noise level present in a telephone line and the level of the DTMF signal that arrives from the telephone line to be separated.

Accordingly, with the exception of cases in which the noise level is abnormally high, the comparator/discriminator circuit 558 outputs "1" when the DTMF signal is arriving and "0" at all other times. The output of the comparator/discriminator circuit 558 is delivered to the detection logic 560 by a signal line G-9. The detection logic 560 uses the information "0" or "1" inputted through the signal lines G-1~G-9 to detect two inputted frequencies and produce an output through a signal line H.

The description rendered above may be summarized as follows:

When the DTMF signal arrives, signal lines G-1~G-8 attain steady operation upon passing through a state of instability due to the transient response of the band-pass filters 520~527. As a result, a fixed state is attained. More specifically, one of the signal lines G-1~G-4 attains logical "1" and so does one of the signal lines G-5~G-8. On the other hand, with regard to the signal line G-9, the arriving energies are detected in all frequencies. Accordingly, when the DTMF signal arrives and the energy present in the telephone line increases, "1" is outputted.

The details of the detection logic 560 will now be described in accordance with the flowchart of FIG. 12.

First, at step S1 of the flowchart, it is determined whether the signal line G-9 shown in FIG. 10, namely the FCD (first carrier digit), is "ON" ("1"), thereby determining whether energy above a prescribed level is present on the telephone line. If energy above the prescribed level is not present on the telephone line, step S1 is repeated. If FCD is "ON", however, the program proceeds to step S2, at which a 50 msec timer is set in order to investigate whether FCD is maintained in the "ON" state continuously. Next, at steps S3 and S4, it is determined whether FCD is maintained in the "ON" state continuously for 50 msec. If FCD reverts to the "OFF" state at some point during the 50 msec time period, the program returns to step S1 and the system waits for FCD to assume the "ON" state again.

The period of 50 msec mentioned above is a value decided by the specifications of the DTMF signal in order that an instance in which FCD turns "ON" but does not remain "ON" continuously for 50 msec may be regarded as being a rise in the FCD signal brought about by noise. It should be noted that the time period is not limited to 50 msec in this invention.

Next, when it is determined that FCD has remained "ON" continuously for 50 msec, the program proceeds to step S5, at which a transition from the "ON" to the "OFF" state of FCD is checked. When this transition in state is detected ("NO" at step S5), the program proceeds to step S6, at which DTMF discrimination processing is executed in response to the aforementioned transition.

In DTMF discrimination processing, a signal corresponding to a signal frequency and composition of the DTMF signal specifications shown in Table 1 is detected based upon the information on the signal lines G-1~G-8 shown in FIGS. 9 and 10. In the absence of a pertinent signal, information such as an error code is outputted as the detection value instead.

A basic arrangement wherein the DTMF detector set forth above is applied to a facsimile machine will be described with reference to FIG. 13.

Figure 13:
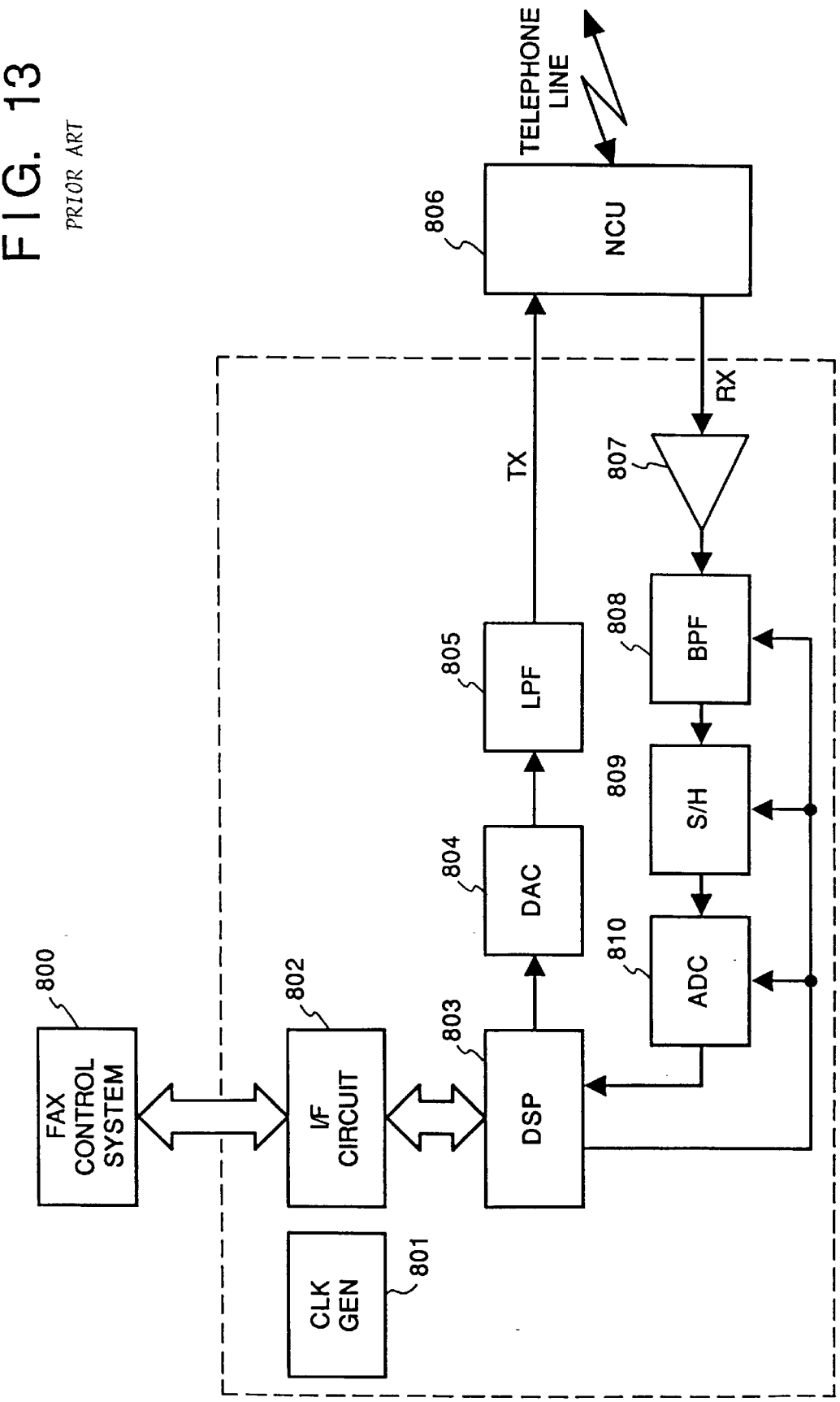
FIG. 13 is a block diagram showing the configuration of a facsimile machine equipped with an ordinary DTMF detector.

Shown in FIG. 13 are a FAX control system 800, a clock generator (CLK GEN) 801, an interface (I/F) circuit 802, a digital signal processor (DSP) 803, a D/A converter (DAC) 804, a low-pass filter (LPF) 805 for the communication band, an NCU 806, an amplifier 807, a BPF 808, a sample/hold (S/H) circuit 809 and an A/D converter (ADC) 810.

The block enclosed by the dashed line in FIG. 13 constructs a modem incorporated in the facsimile machine. Furthermore, the A/D 500 shown in FIG. 9 is realized by the ADC 810 in FIG. 13. Components other than the A/D 500 usually are realized by firmware implemented by the DSP 803. Accordingly, the output of the DTMF detector is transmitted to the FAX control system 800 via the interface circuit 802 in FIG. 13 by signal line H shown in FIG. 9.

Figure 14:
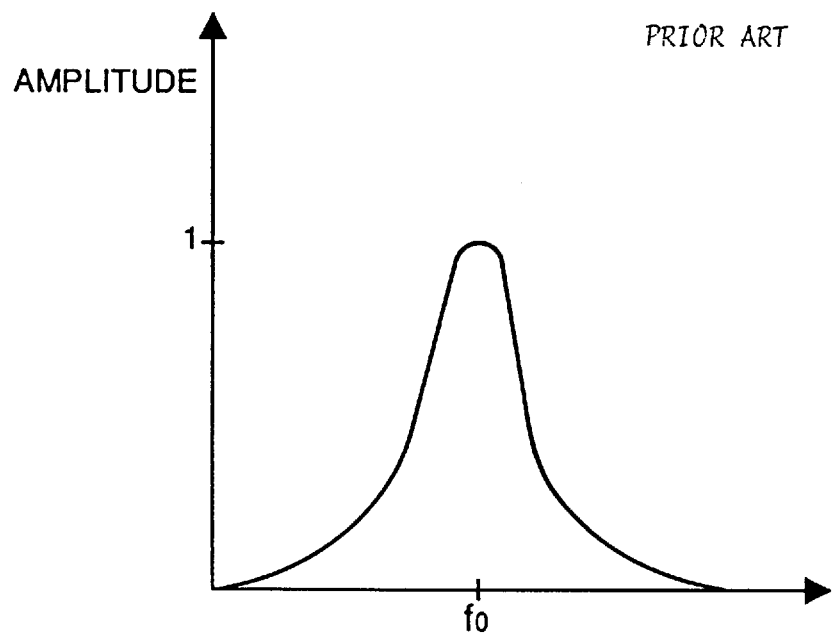
FIG. 14 is a diagram showing the frequency characteristic of an ordinary BPF.
Figure 15:
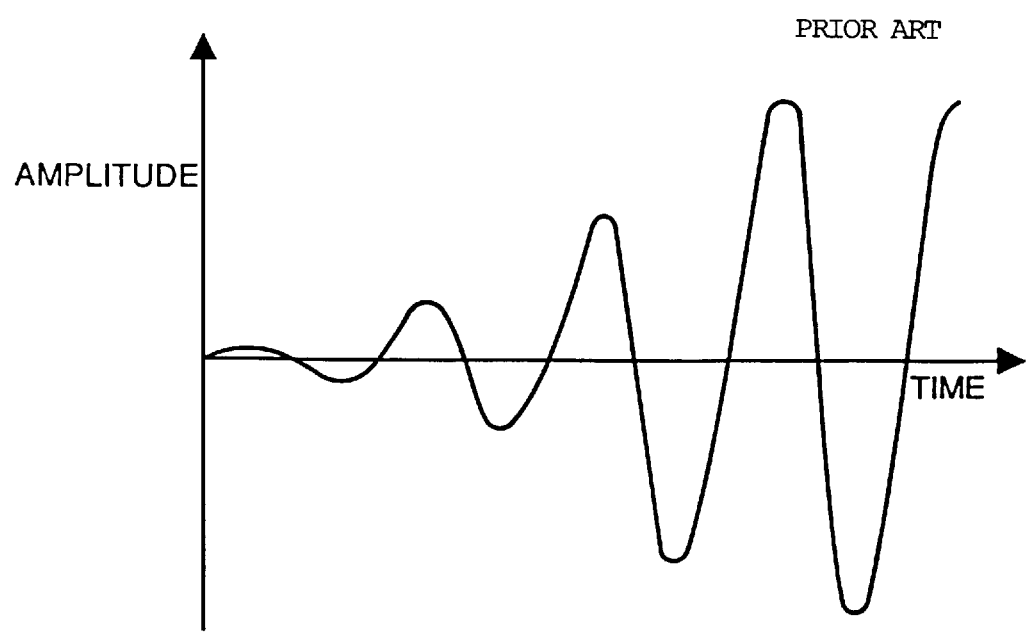
FIGS. 15 and 16 are diagrams showing the sine wave response of an ordinary BPF.

FIG. 14 is a diagram showing the frequency characteristic of the band-pass filters 520~527 constituting the DTMF detector. In FIG. 14, a center frequency $f_o$ has one of the values 1633 Hz, 1477 Hz, 1336 Hz, 1209 Hz, 941 Hz, 852 Hz, 770 Hz and 697 Hz. In order to eliminate components other than the single frequency of interest to the greatest degree possible, the bandwidth of the pass frequency has a very narrow value capable of allowing a frequency offset that can occur in the telephone line. FIG. 15 is a diagram showing the center-frequency sine wave response of the band-pass filters. The propagation of the sine wave energy is very slow, as evident from the diagram. In general, the characteristics of the band-pass filter are such that the narrower the band is made, the slower the propagation of the energy of the filter with respect to the input of the center-frequency sine wave.

Figure 16:
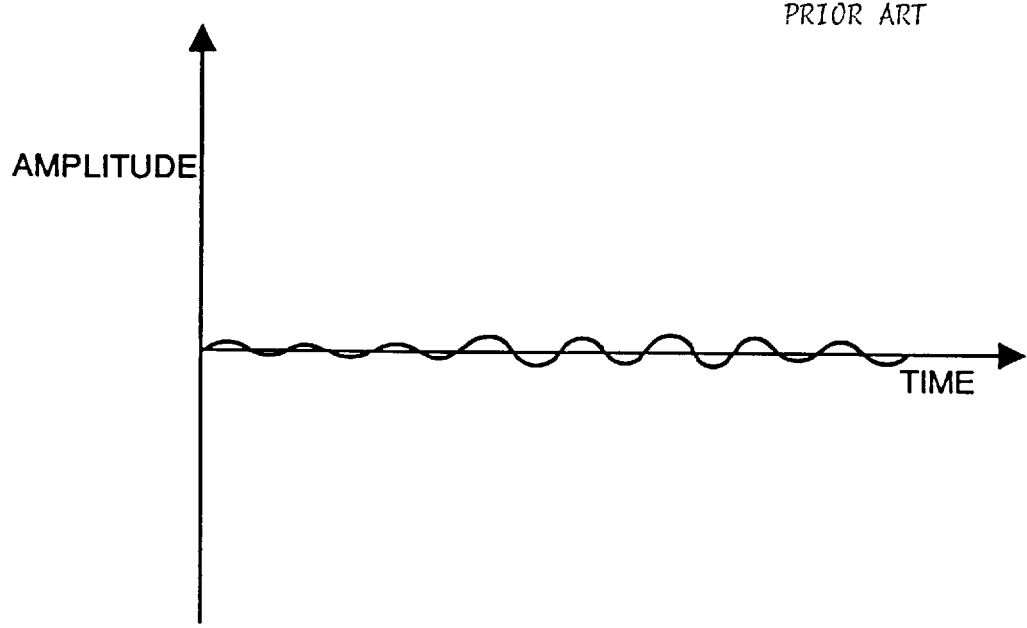

FIG. 16 is a diagram showing filter response when a stop-band sine wave is applied to the filter. As clearly shown, the band-pass filter passes almost none of the stop-band sine wave, and therefore the difference between the energy in the cut-response region and the energy in the steady state is small.

Figure 17:
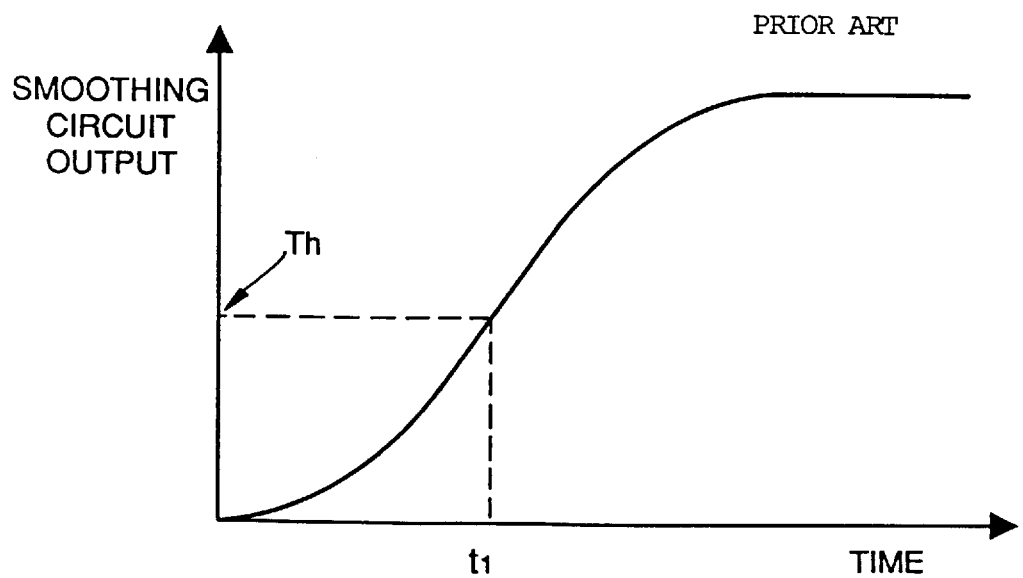
FIGS. 17 and 18 are diagrams showing outputs of an ordinary smoothing circuit.
Figure 18:
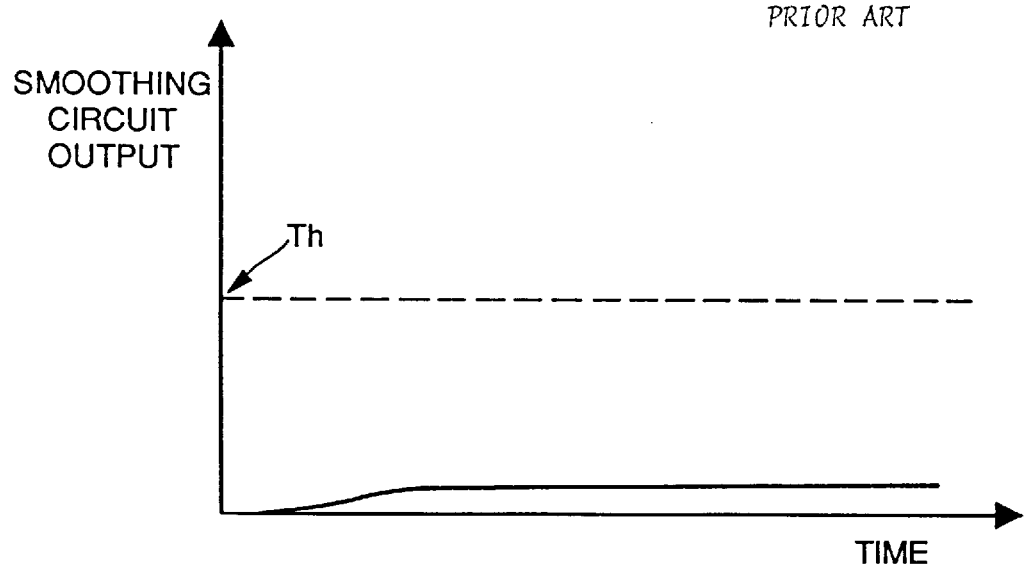

FIGS. 17 and 18 are graphs in which time is plotted along the horizontal axis and smoothing-circuit output along the vertical axis. In particular, FIG. 17 represents the output of a smoothing circuit when a center-frequency sine wave is applied tp a narrow-band band-pass filter. A period of $t_1$ sec is required for the value of the smoothing-circuit output to exceed the threshold voltage Th used in the comparator/discriminator circuit to which this output is applied. In other words, even when the DTMF signal arrives, the output of the comparator/discriminator circuit will not become "1" for $t_1$ sec.

Figure 12:
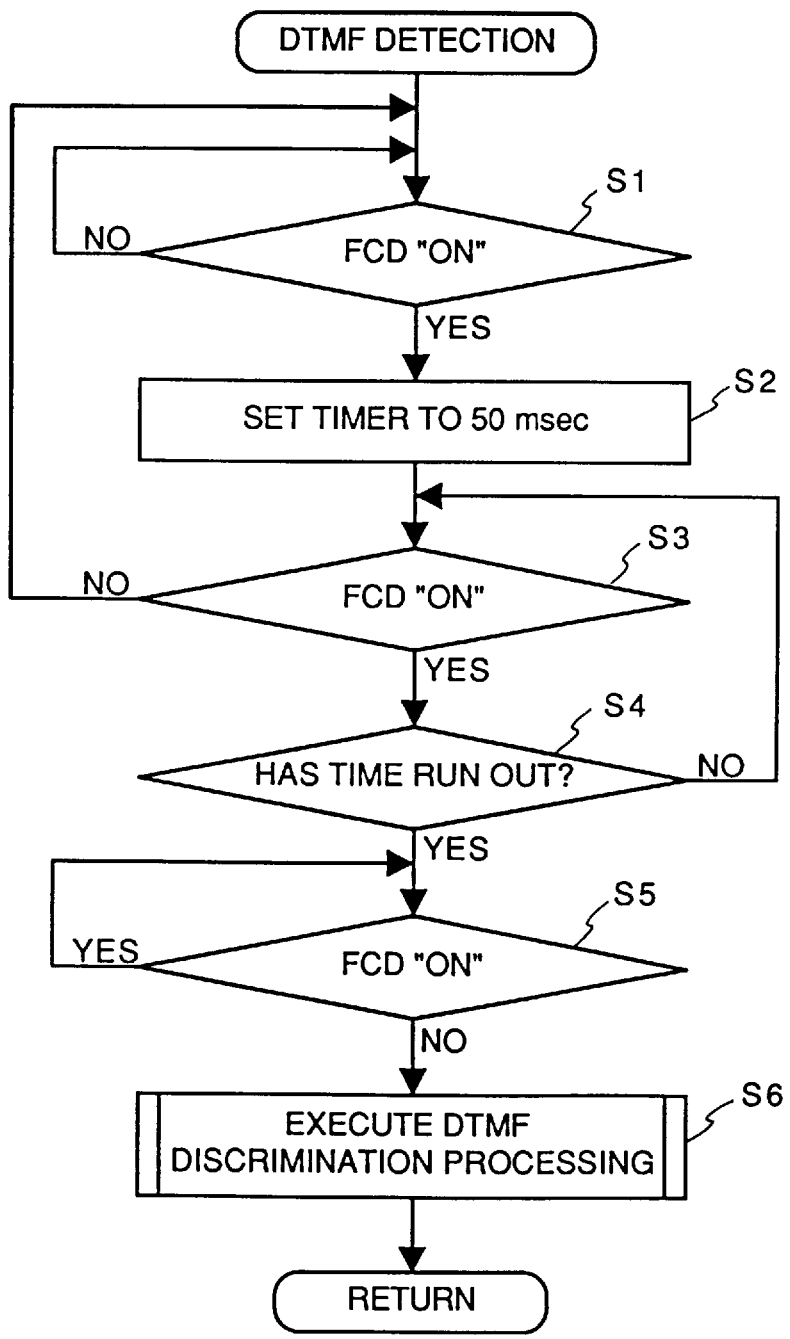
FIG. 12 is a flowchart showing the algorithm of ordinary detection logic.

Accordingly, as apparent from FIG. 12, if $t_1$ sec is greater than 50 msec, there are instances where a false dismissal occurs even though the DTMF signal has arrived. If the band of the BPF is broadened so that the time of $t_1$ sec may become a value sufficiently smaller than 50 msec, a false alarm frequency occurs despite the fact that the DTMF signal has not arrived. That is, an erroneous decision frequently is rendered to the effect that the DTMF signal has arrived even though it has not.

FIG. 18 represents smoothing-circuit output when a stop-band sine wave is applied to a narrow-band band-pass filter. In the stopping region of a narrow-band band-pass filter, there is some frequency leakage but the value of the smoothing-circuit output is confined to a value sufficiently smaller than the threshold value Th.

<First Embodiment>

Figure 1:
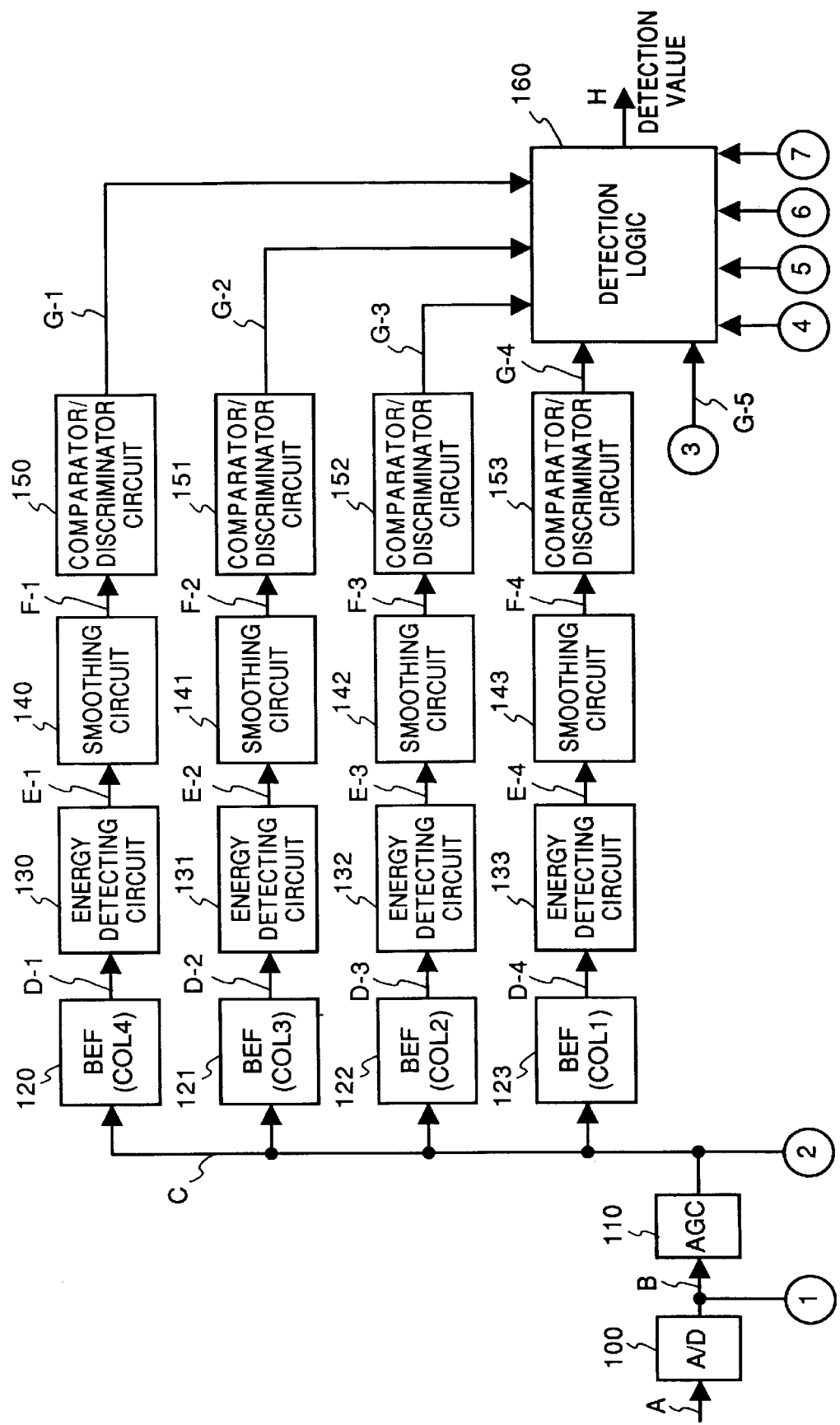
FIGS. 1 and 2 are block diagrams showing the circuitry of a DTMF detector according to a first embodiment of the invention.
Figure 2:
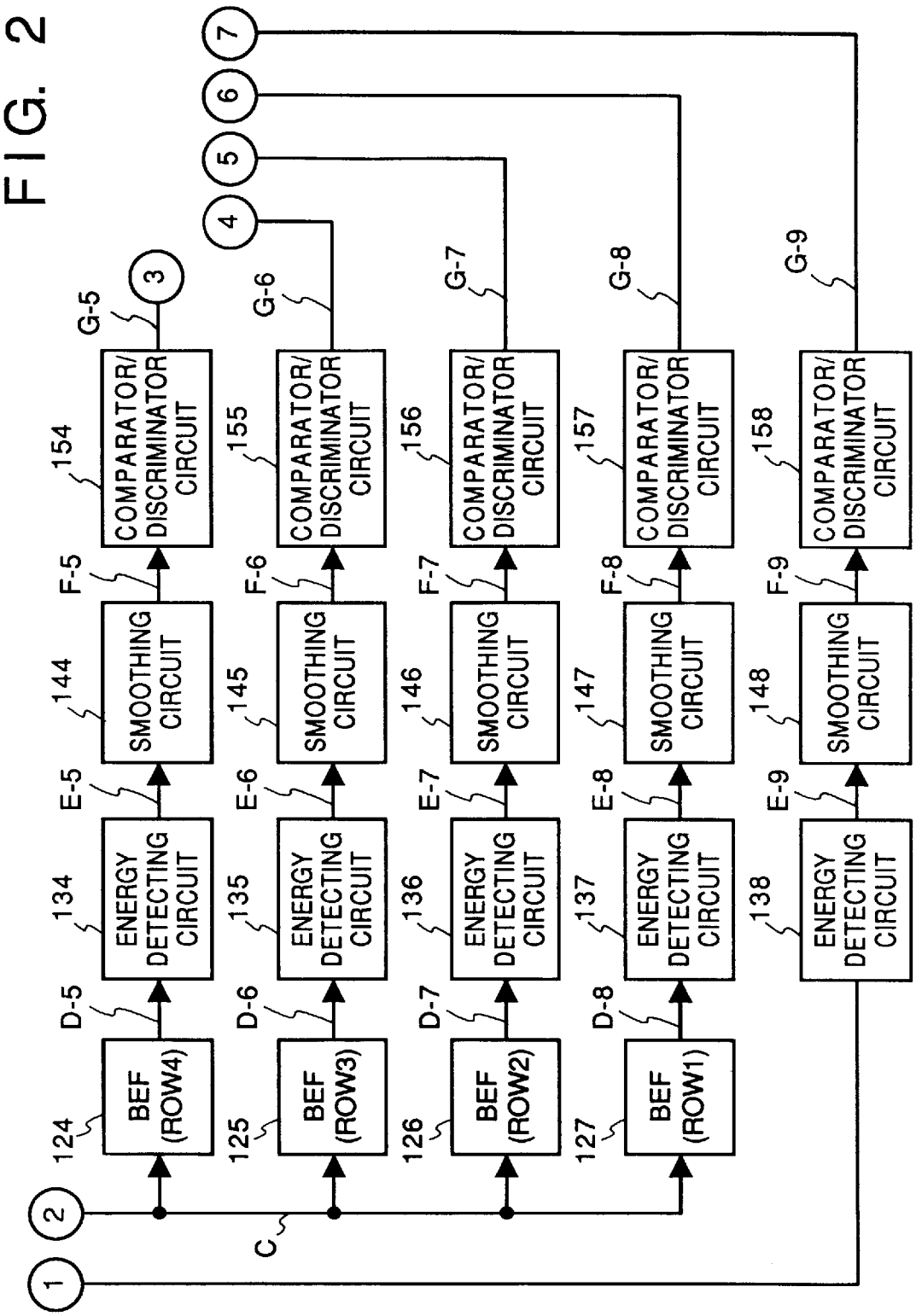

FIGS. 1 and 2 are diagrams illustrating the circuitry of a DTMF detector according to a first embodiment of the invention. It should be noted that circuit components which are an A/D converter 100, an AGC 110, energy detecting circuits 130~138, smoothing circuits 140~148, a logic block 160 and a comparator/discriminator circuit 158 have functions identical with those of the A/D converter 500, AGC 510, energy detecting circuits 530~538, smoothing circuits 540~548, logic block 560 and comparator/discriminator circuit 558 in the arrangement of the DTMF detector shown in FIGS. 9 and 10, and therefore a description of these functions is omitted.

In FIGS. 1 and 2, the quantized DTMF signal is inputted from the signal line C to high group frequency (1633 Hz, 1477 Hz, 1336 Hz, 1209 Hz) band-elimination filters (BEF) 120~123 and, at the same time, to low group frequency (941 Hz, 852 Hz, 770 Hz, 697 Hz) band-elimination filters (BEF) 124~127. The eight BEFs 120~127 detect a DTMF signal comprising one frequency among the four high group frequencies and one frequency among the four low group frequencies. In order to detect the high group frequencies, the BEFs 120, 121, 122 and 123 are designed to have center frequencies of 1633 Hz, 1477 Hz, 1336 Hz and 1209 Hz, respectively. In order to detect the low group frequencies, the BEFs 124, 125, 126 and 127 are designed to have center frequencies of 941 Hz, 852 Hz, 770 Hz and 697 Hz, respectively.

Accordingly, when the DTMF signal arrives, the energies of the output of one of the four BEFs for high group frequency detection and of the output of one of the four BEFs for low group frequency detection corresponding to the high group frequencies and low group frequencies, which are the main frequency components of the DTMF signal, become smaller relative to the energies of the other six BEF outputs.

Next, the signals filtered by the BEFs 120~127 enter the respective energy detecting circuits 130~137 through the corresponding signal lines D-1~D-8.

The comparator/discriminator circuits 150~157 compare reference threshold levels with the outputs of the corresponding smoothing circuits 140~148 and output "0" when the output of the smoothing circuit is larger and "1" when the output of the smoothing circuit is smaller. Thus, the comparator/discriminator circuits 150~157 function to judge relative magnitude.

Figure 3:
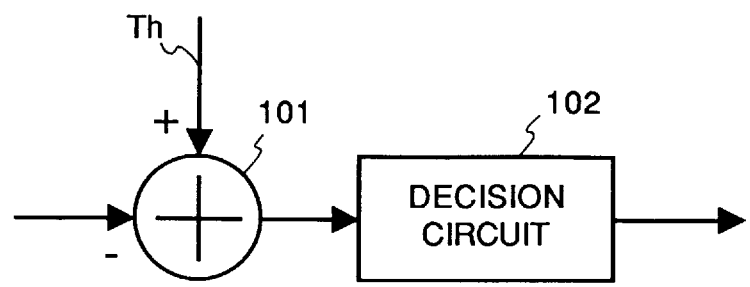
FIG. 3 is a block diagram showing the construction of a comparator/discriminator circuit diagram according to the first embodiment.

FIG. 3 shows an example of a typical comparator/discriminator circuit. As shown in FIG. 3, the input signal is subtracted from the threshold level Th by an adder circuit 101. A decision circuit 102 outputs "1" if the result of addition is positive and "0" if the result is negative. The results of comparison and judgment outputted by the comparator/discriminator circuits 150~157 are delivered to the detection logic 160 by the signal lines G-1~G-8.

Figure 4:
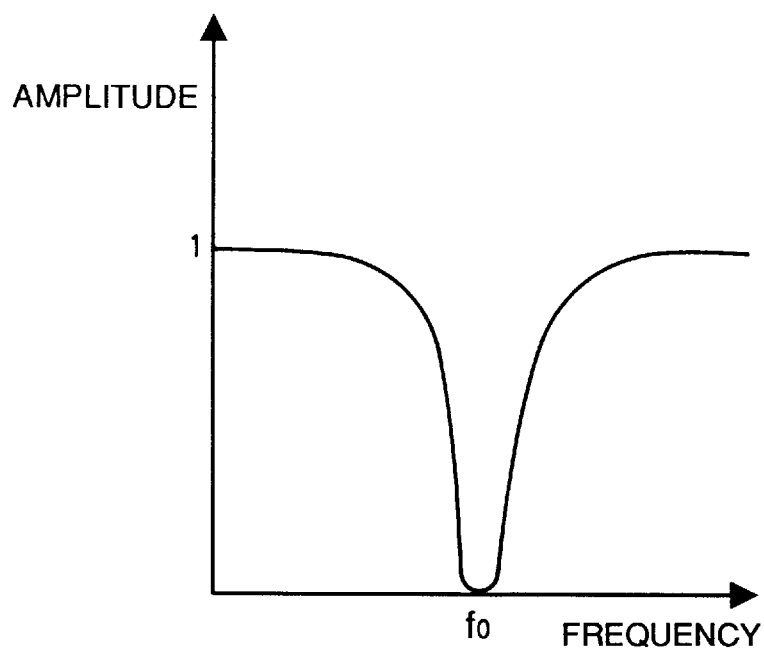
FIG. 4 is a diagram showing the frequency characteristic of a BEF in the first embodiment.

FIG. 4 is a diagram showing the frequency characteristic of each of the BEFs 120~127. In FIG. 4, a stop-band center frequency $f_o$ has one of the values 1633 Hz, 1477 Hz, 1336 Hz, 1209 Hz, 941 Hz, 852 Hz, 770 Hz and 697 Hz. In order to eliminate components other than the single frequency of interest to the greatest degree possible, the bandwidth of the stop frequency has a very narrow value capable of allowing a frequency offset that can occur in the telephone line.

Figure 5:
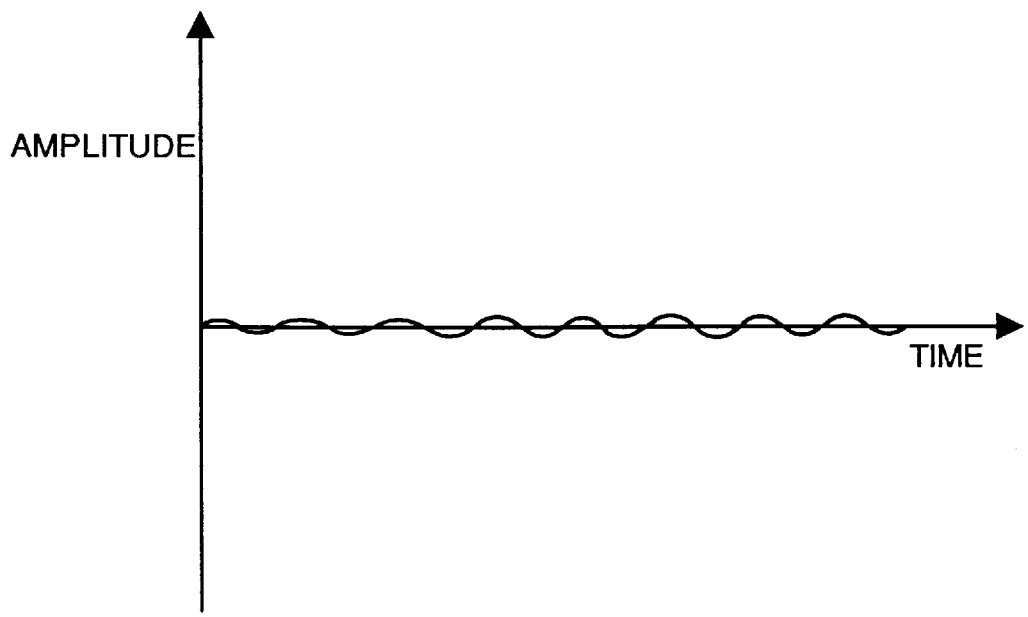
FIGS. 5 and 6 are diagrams showing the sine wave response of the BEF in the first embodiment.

FIG. 5 is a diagram showing the stop-band center-frequency sine wave response of the band-elimination filters (BEFs). Since the BEFs pass almost no stop-band center-frequency sine waves, there is no difference between energy in a transient response region and energy in a normal state.

Figure 6:
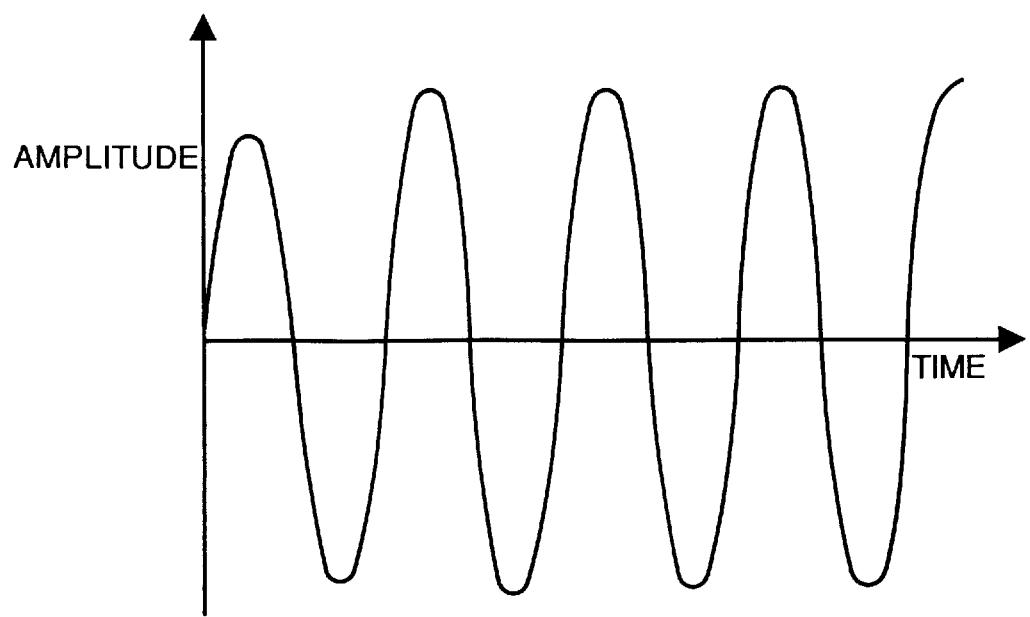

FIG. 6 is a diagram showing filter response in a case where a pass-band sine wave is inputted to the BEF. Unlike the case where the pass-band sine wave is inputted to the BPF, the propagation of the sine wave energy is extremely fast.

Figure 7:
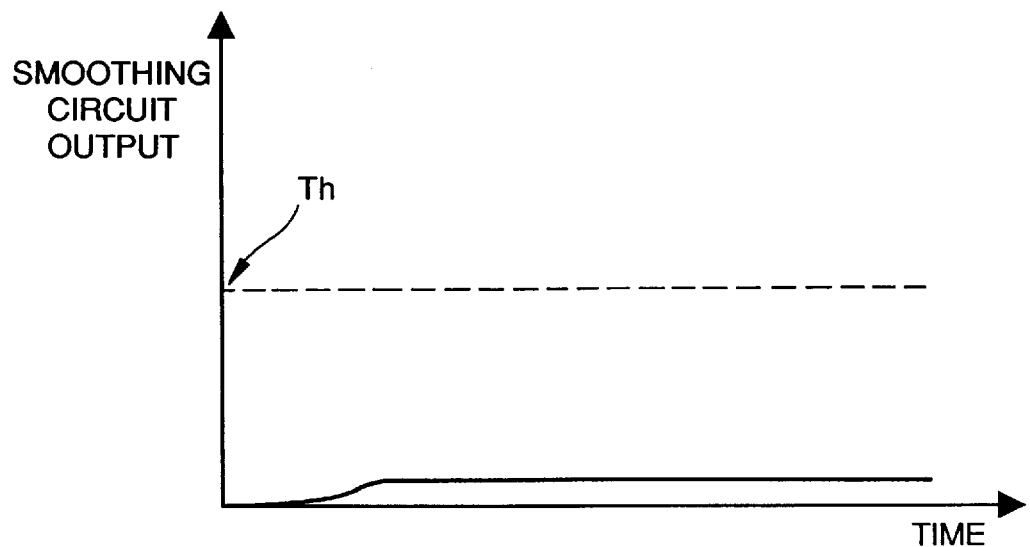
FIGS. 7 and 8 are diagrams showing outputs of a smoothing circuit in the first embodiment.

FIG. 7 is a diagram showing smoothing-circuit output for a case where the stop-band sine wave is inputted to a narrow-band BEF. A value sufficiently smaller than the threshold level Th is maintained in both the transient state and steady state.

Figure 8:
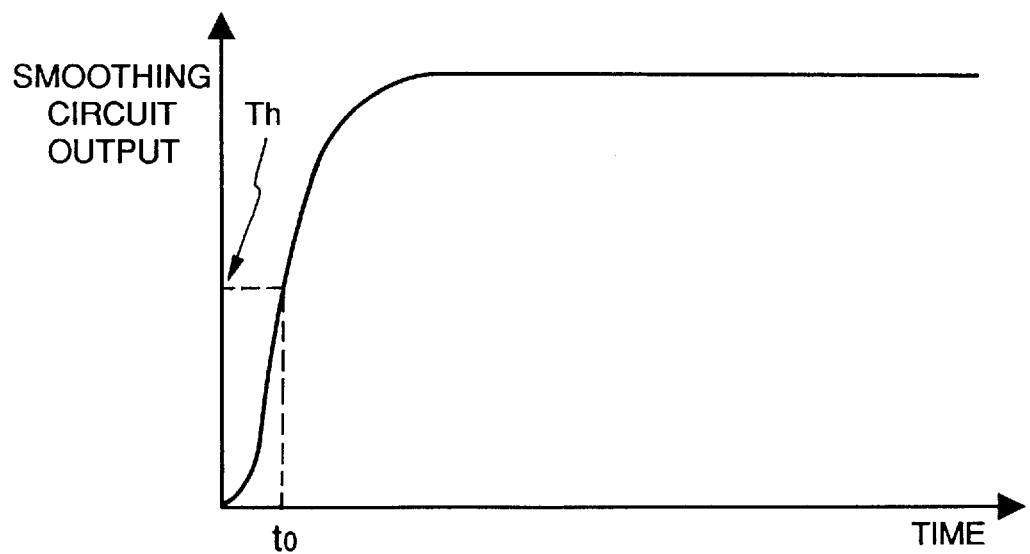

FIG. 8 is a diagram showing the output of a smoothing circuit when a pass-band sine wave is applied to a narrow-band BEF. A period of $t_0$ ($<<t_1$) sec is required for the value of the smoothing-circuit output to exceed the threshold voltage Th used in the comparator/discriminator circuit to which this output is applied. In an ordinary DTMF detector, $t_1$ sec is required, as clear from FIG. 17. This means that the rise in smoothing-circuit output takes place comparatively soon.

Described next will be the function of the signal lines G-1~G-9 in a case where the BEFs having characteristics of the kind described above are used for the purpose DTMF signal detection.

The signal lines G-1~G-8 attain steady operation upon passing through a state of instability due to the transient response (the duration of which is shorter than that of the above-described DTMF) of the BEFs 120~127. As a result, a fixed state is attained. More specifically, only one of the signal lines G-1~G-4 attains logical "1" and so does one of the signal lines G-5~G-8. On the other hand, with regard to the signal line G-9, since the arriving energies are detected in all frequencies, "1" is outputted when the DTMF signal arrives and the energy present in the telephone line increases. The detection logic 160 for detecting the DTMF signal using the signal lines G-1~G-9 is the same as that described above and need not be described again.

Thus, in accordance with the first embodiment, as described above, there can be provided a DTMF detector in which the time from arrival of the DTMF signal to detection thereof is shortened and erroneous detection of the DTMF signal seldom occurs.

<Second Embodiment>

A second embodiment according to the present invention will now be described in detail with reference to the drawings.

Figure 19:
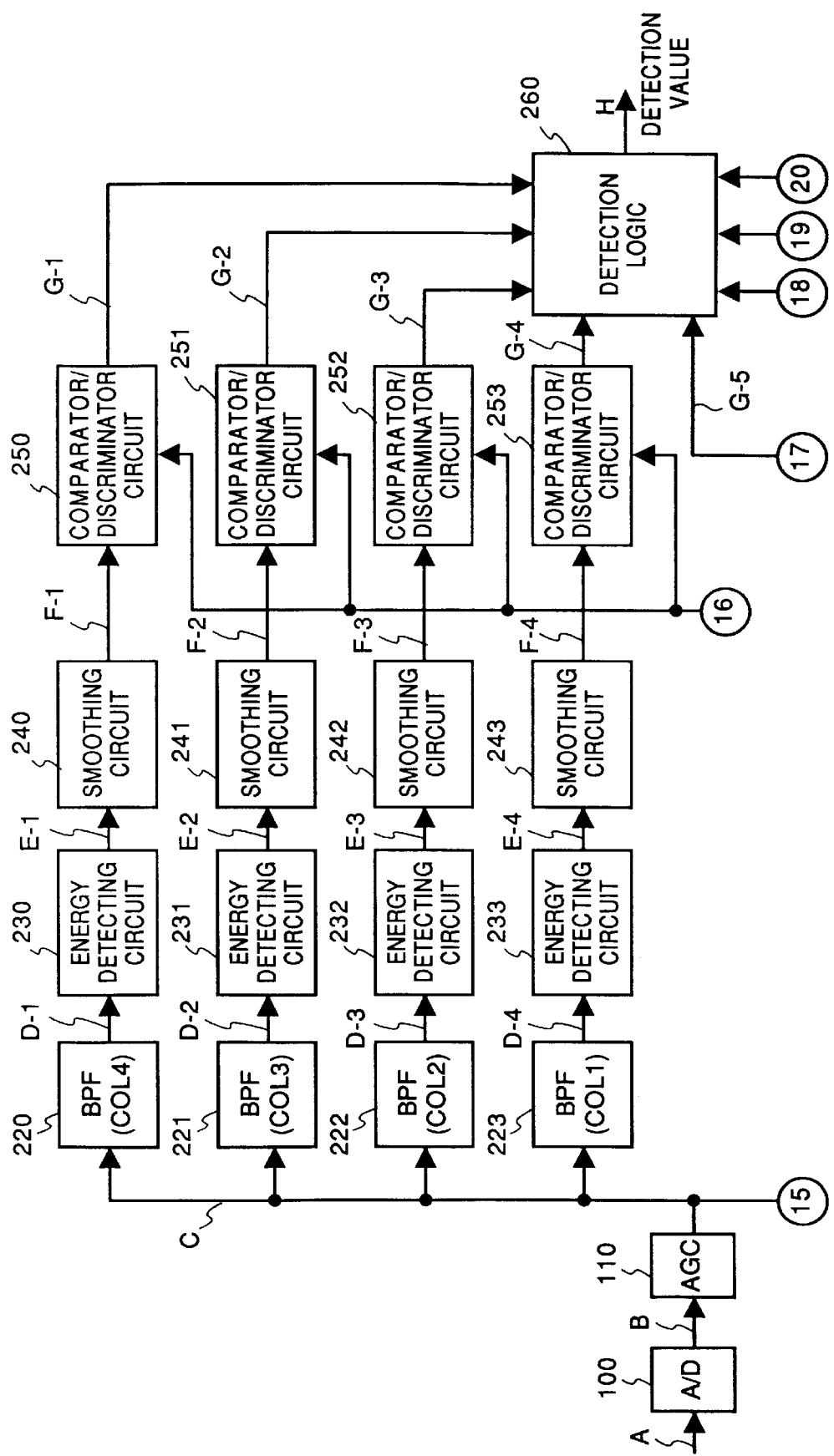
FIGS. 19 and 20 are block diagrams showing the circuitry of a DTMF detector according to a second embodiment of the invention.
Figure 20:
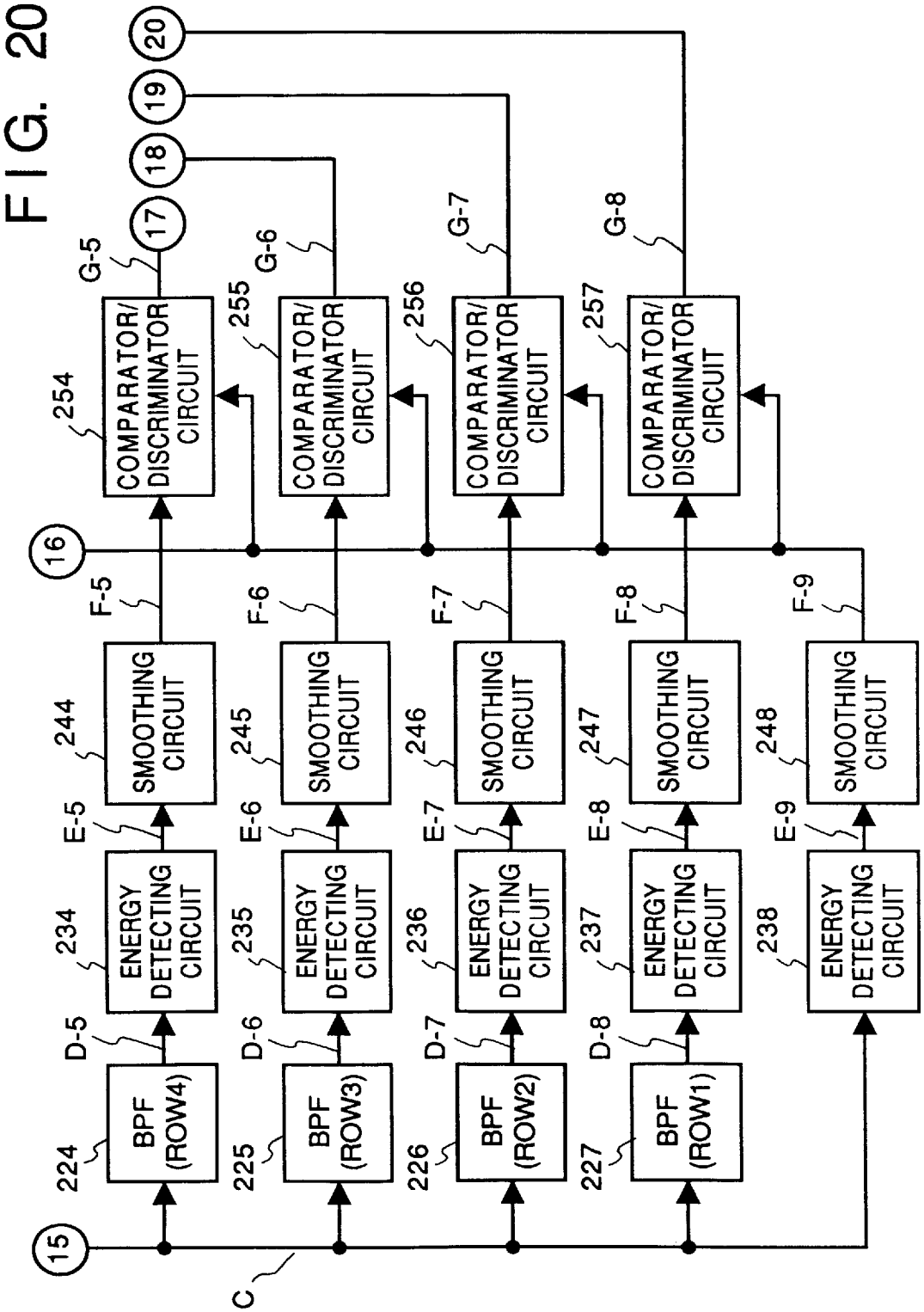

FIGS. 19 and 20 are diagrams illustrating the circuitry of a DTMF detector according to a second embodiment of the invention. In the second embodiment as illustrated, the DTMF is constructed by disposing all of the detectors on the output side of the AGC, namely the detectors that detect the energies of all frequency components present in a line as well as the detector that detects the energy of the DTMF signal component in the line.

It should be noted that circuit components which are the A/D converter 100, the AGC 110, BPFs 220~227, energy detecting circuits 230~238 and smoothing circuits 240~248 have functions identical with those of the A/D converter 500, AGC 510, BPFs 520~527, energy detecting circuits 530~538 and smoothing circuits 540~548 in the arrangement of the DTMF detector shown in FIGS. 9 and 10, and therefore a description of these functions is omitted.

In the arrangement described above, an analog DTMF signal that has arrived from the telephone line via the signal line A enters the A/D converter 100, where the signal is quantized. The resulting quantized DTMF signal is applied to the AGC 110 through the signal line B. The output of the AGC 110 is inputted to the BPFs 220~227. The average energies of the respective frequency components are obtained by the energy detecting circuit 230~237 and smoothing circuits 240~247, and the average energy of all frequency components is obtained by the energy detecting circuit 238 and smoothing circuit 248.

Figure 21:
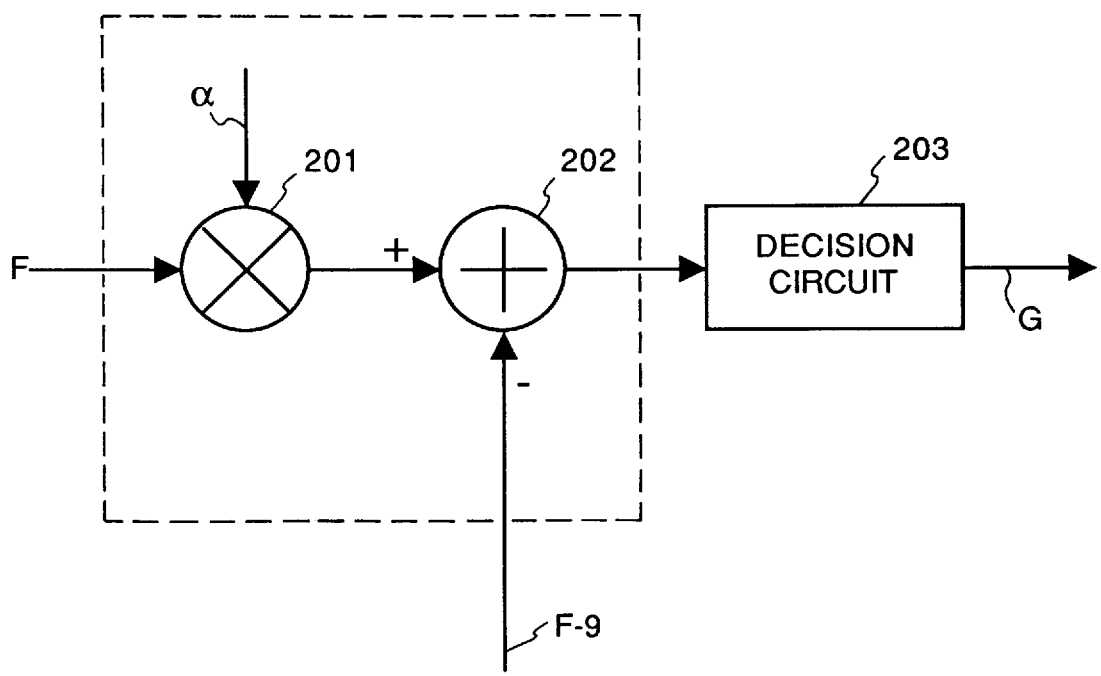
FIG. 21 is a block diagram showing the construction of a comparator/discriminator circuit according to the second embodiment.

Comparator/discriminator circuits 250~257 have two input signal lines, one or both of which is weighted, and function to discriminate the results of comparing inputs to the two lines. FIG. 21 is an example of a typical comparator/discriminator circuit. In FIG. 21, F signifies any one of the signal lines F-1~F-8 in FIGS. 19 and 20. A signal that has entered from the signal line F is multiplied by a weighting constant α in a weighting multiplier 201, and the signal on signal line F-9 is subtracted from the resulting product by an adder 202, which is for comparing signal size. The signal resulting from subtraction is inputted to a decision circuit 203, which outputs "1" to the signal line G if the value of this signal is positive and "0" if the value is negative. In other words, by selecting the constant α appropriately, the outputs of comparator/discriminator circuits comparing and discriminating the average output energies of two BPFs tuned to two different sine waves forming a DTMF signal currently being received can be made "1", and the outputs of comparator/discriminator circuits comparing and discriminating the average output energies of the six BPFs not tuned can be made "0". The block indicated by the dashed lines in FIG. 21 constructs a weighting comparator circuit.

Figure 22:
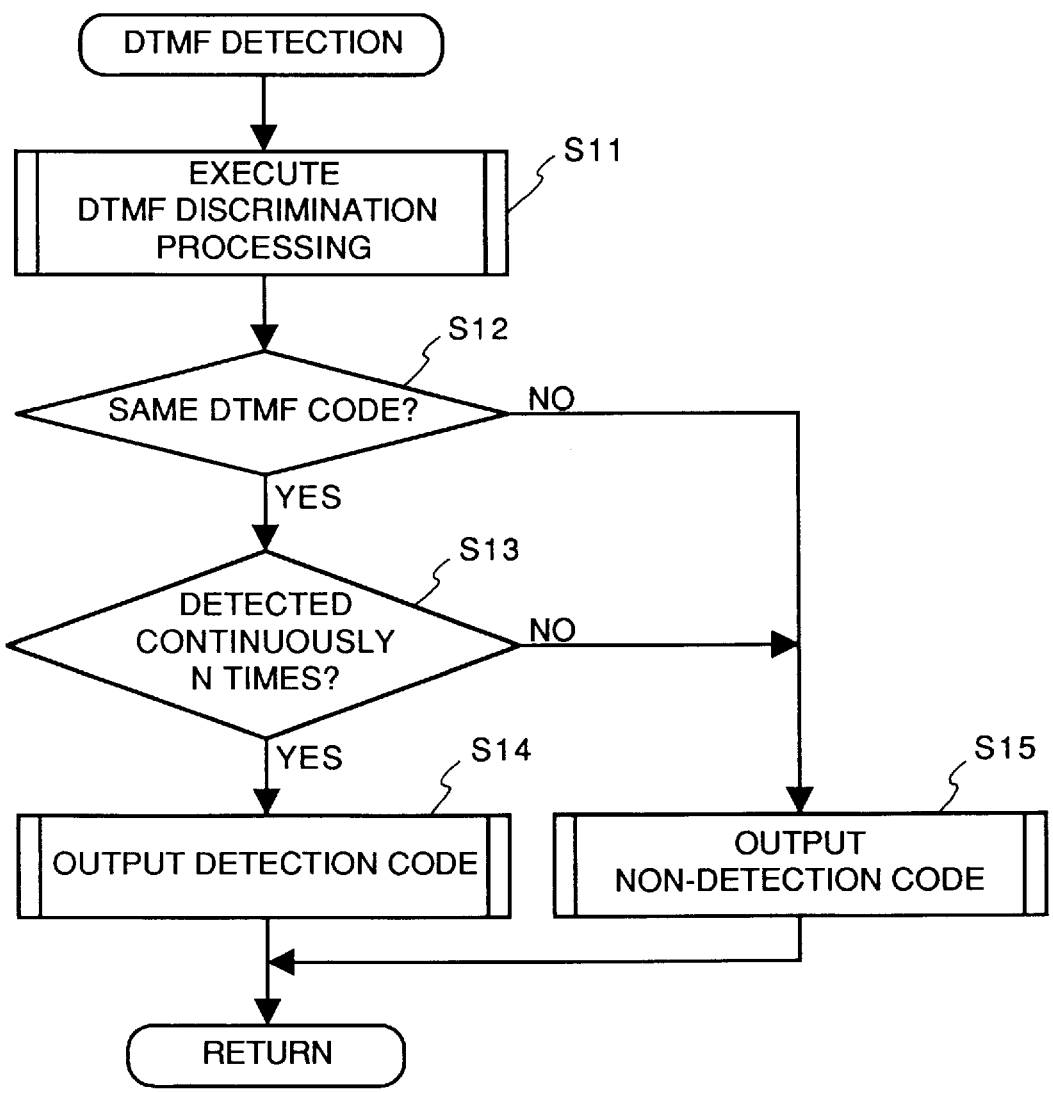
FIG. 22 is a flowchart of detection logic according to the second embodiment.

The algorithm of the detection logic 260 in this embodiment will now be described in accordance with the flowchart shown in FIG. 22.

First, at step S11, DTMF discrimination processing is executed. In DTMF discrimination processing, a signal corresponding to a signal frequency and composition of the DTMF signal specifications shown is adopted as a discrimination value based upon the information on the above-mentioned signal lines G-1~G-8. In the absence of a pertinent signal, information such as an error code is outputted at the discrimination value instead. Next, at step S12, it is determined whether the discrimination value is the same as the DTMF discrimination value that prevailed when the immediately preceding DTMF detection routine was called. If the value is the same, the program proceeds to step S13; if not, the program proceeds to step S15. This is followed by step S13, at which it is determined whether the identical DTMF discrimination value has been detected continuously for a preset number of times N. If the value has been detected continuously, the program proceeds to step S14, where the corresponding detection code is outputted to signal line H. If the value is not detected continuously, the program proceeds to step S15, where a non-detection code is outputted to signal line H.

In this example, it is determined whether the DTMF discrimination value is detected continuously N times. This is to prevent erroneous detection of the DTMF signal caused by the transient response of the DTMF detector circuitry when the DTMF signal is turned on and off, and by such troubles as impulse noise in the line, momentary disconnection, etc.

Figure 23:
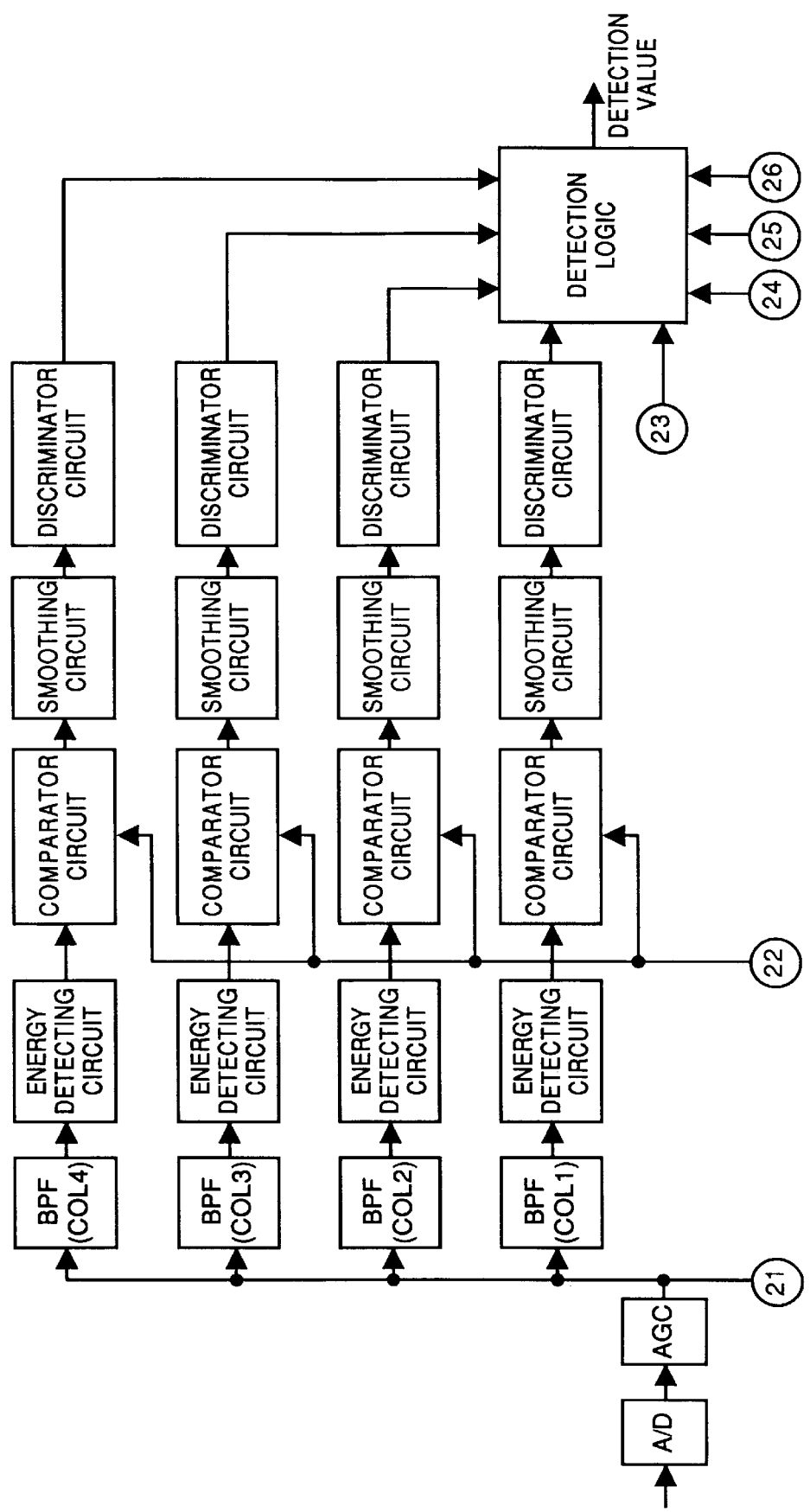
FIGS. 23 and 24 are block diagrams showing the circuitry of a DTMF detector according to a modification of the second embodiment.
Figure 24:
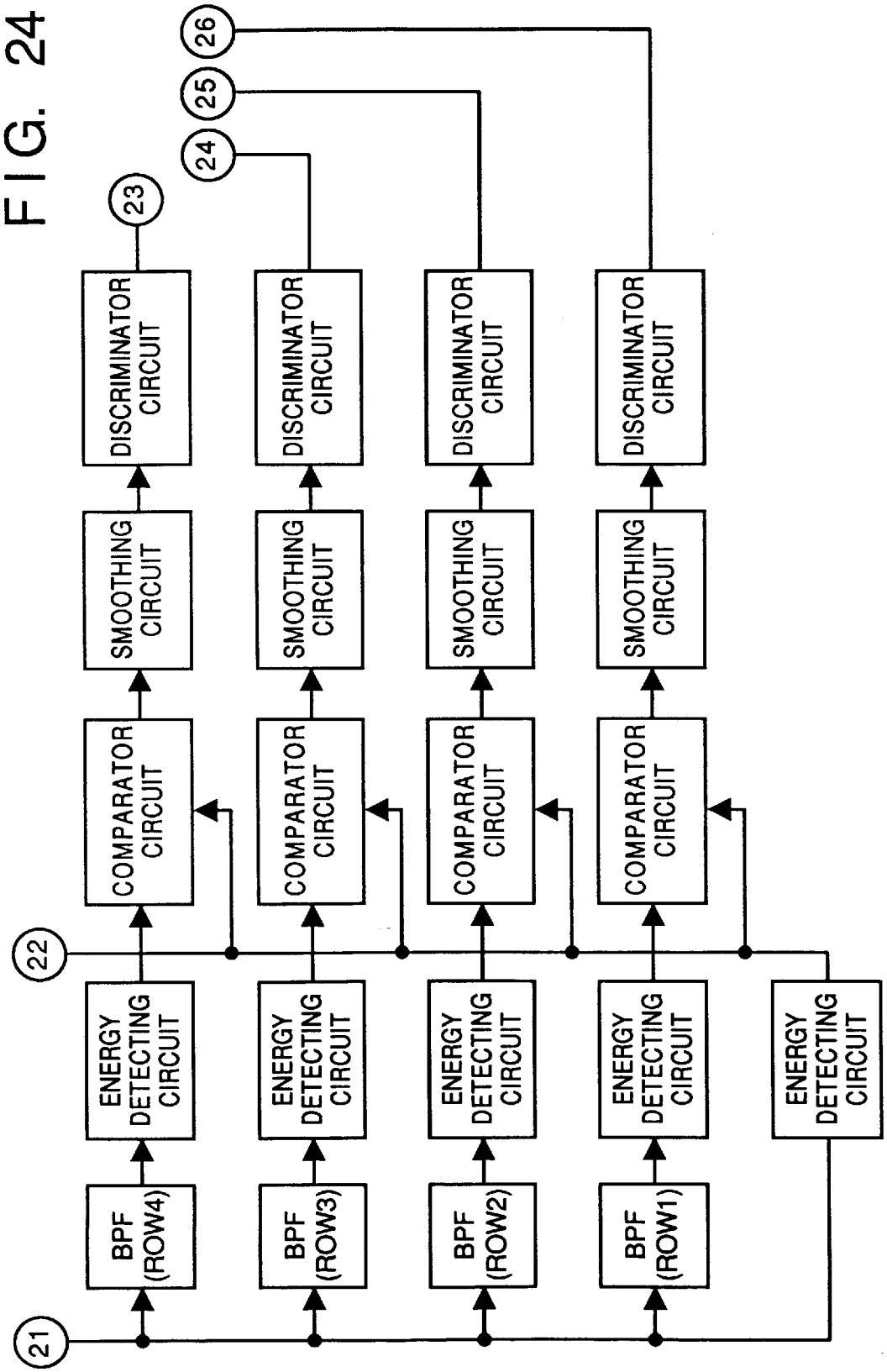

In the foregoing embodiment, an arrangement is described in which the comparator/discriminator circuits are placed on the output sides of the smoothing circuits. However, this does not impose a limitation upon the invention. For example, as shown in FIGS. 23 and 24, it is easy to realize an arrangement in which the comparator circuits of the comparator/discriminator circuits are placed on the output sides of the energy detecting circuits while the discriminator circuits of the comparator/discriminator circuits are placed on the output sides of the smoothing circuits.

Furthermore, though a case is described in which one of the two input lines (the signals from the signal lines F-1~F-8) to the comparator/discriminator circuits is weighted, this does not impose a limitation upon the invention. It is possible to adopt an arrangement in which comparison and discrimination are carried out upon weighting the signal from signal line F-9 or the signals from both the signal lines F-1~F-8 and the signal line F-9.

Thus, in accordance with the second embodiment, as described above, it is possible to obtain a DTMF detection characteristic independent of the value of an AGC time constant that decides AGC response. As a result, erroneous detection of the DTMF signal can be made to occur much less frequently. Further, if the detection characteristic is basically independent of the AGC characteristic and the A/D converter possesses a dynamic range sufficient to allow the performance of signal processing in the circuitry located after the AGC circuit, the AGC can be dispensed with and, hence, costs can be lowered.

<Third Embodiment>

A third embodiment of the invention will now be described in detail with reference to the drawings.

Figure 25:
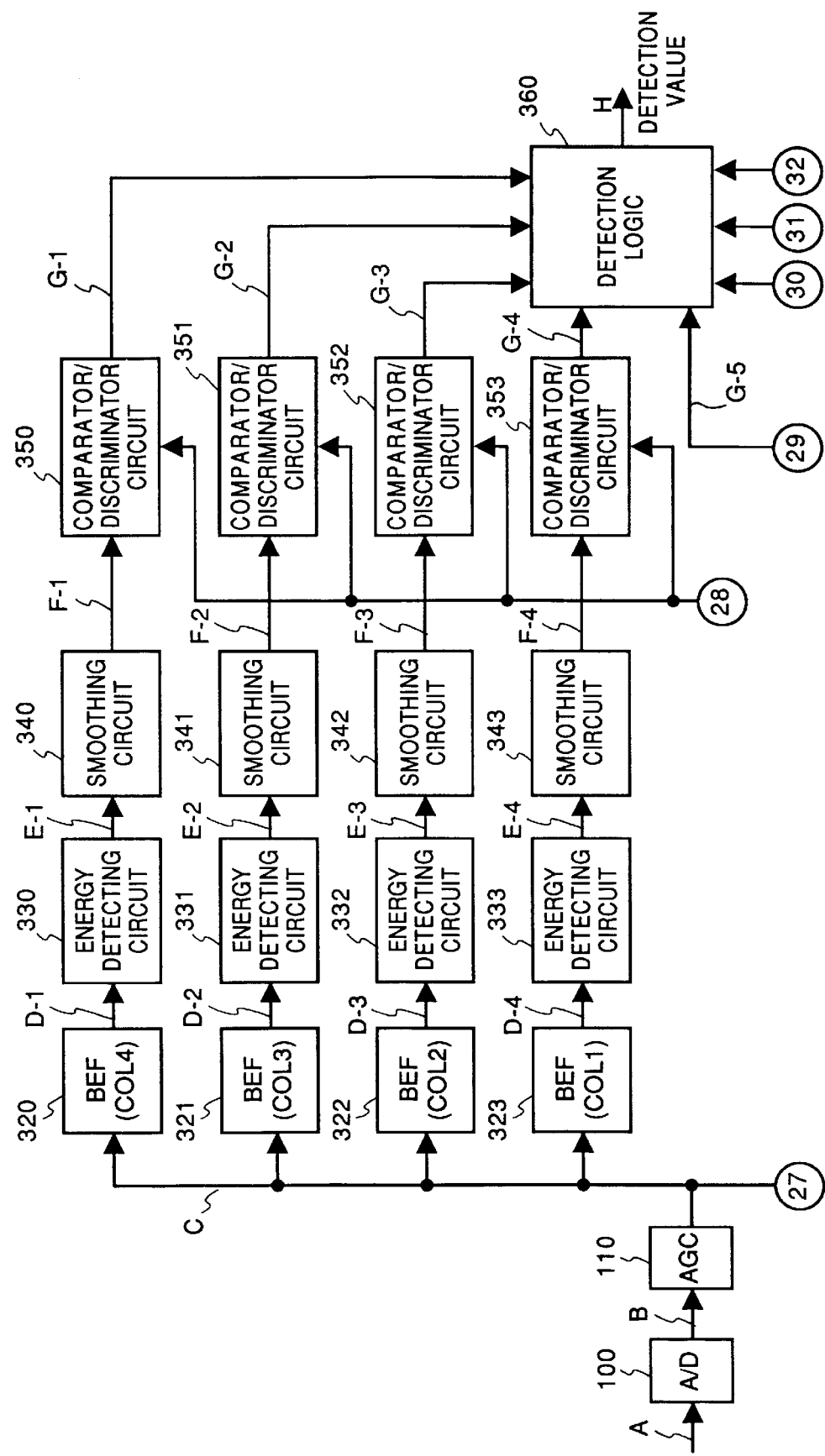
FIGS. 25 and 26 are block diagrams showing the circuitry of a DTMF detector according to a third embodiment of the invention.
Figure 26:
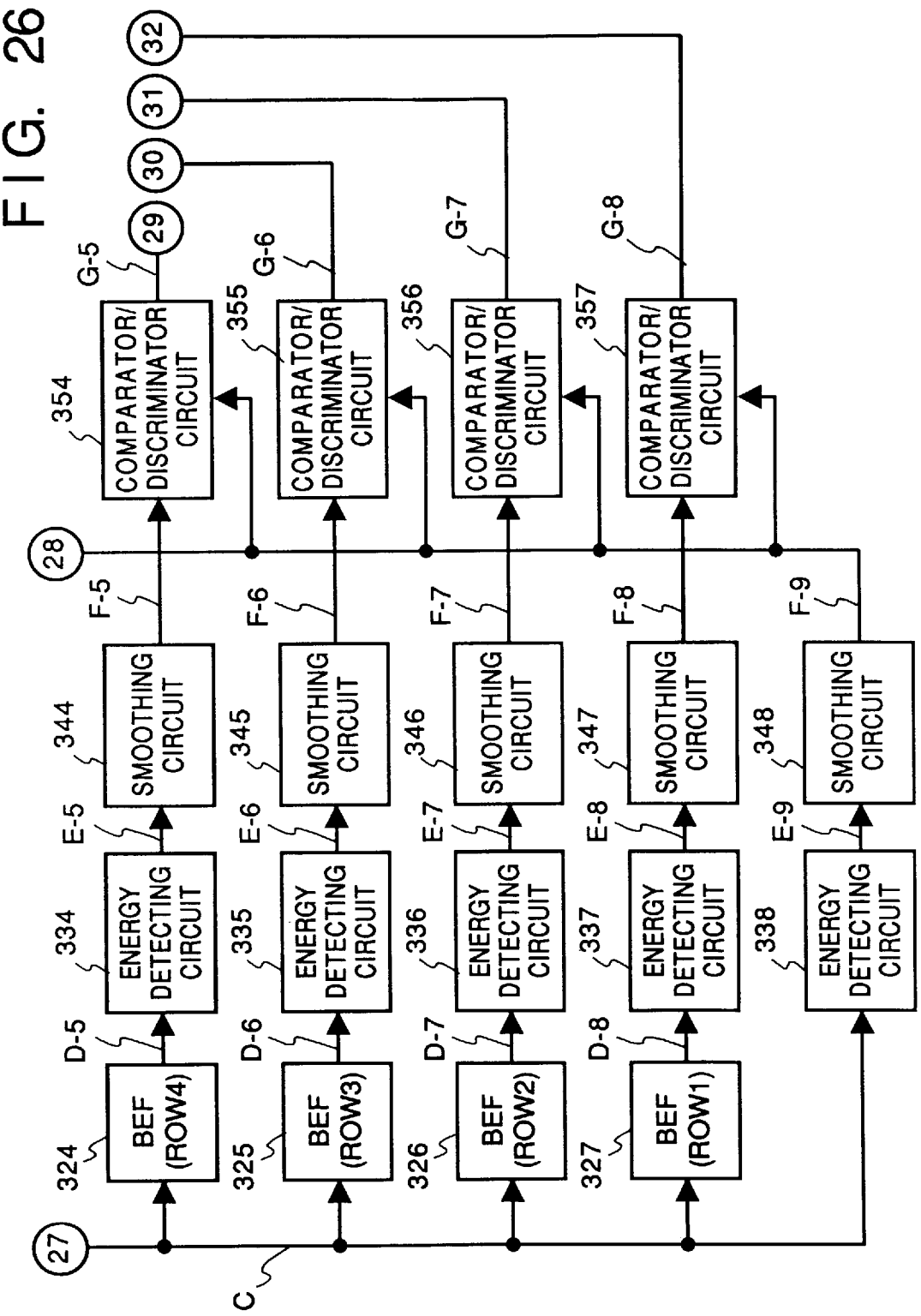

FIGS. 25 and 26 are diagrams illustrating the circuitry of a DTMF detector according to a third embodiment of the invention. In the third embodiment as illustrated, narrow-band band-elimination filters (BEFs) are employed instead of narrow-band band-pass filters (BPFs) as the filters for DTMF signal extraction.

It should be noted that circuit components which are the A/D converter 100, the AGC 110, BEFs 320~327, energy detecting circuits 330~338 and smoothing circuits 340~348 have functions identical with those of the A/D converter 100, AGC 110, BEFs 120~127, energy detecting circuits 130~138 and smoothing circuits 140~148 in the arrangement of the DTMF detector according to the first embodiment, and therefore a description of these functions is omitted.

In the arrangement described above, an analog DTMF signal that has arrived from the telephone line via the signal line A enters the A/D converter 100, where the signal is quantized. The resulting quantized DTMF signal is applied to the AGC 110 through the signal line B. The output of the AGC 110 is inputted to the BEFs 320~327. The average energies of the respective frequency components are obtained by the energy detecting circuits 330~337 and smoothing circuits 340~347, and the average energy of all frequency components is obtained by the energy detecting circuit 338 and smoothing circuit 348.

Figure 27:
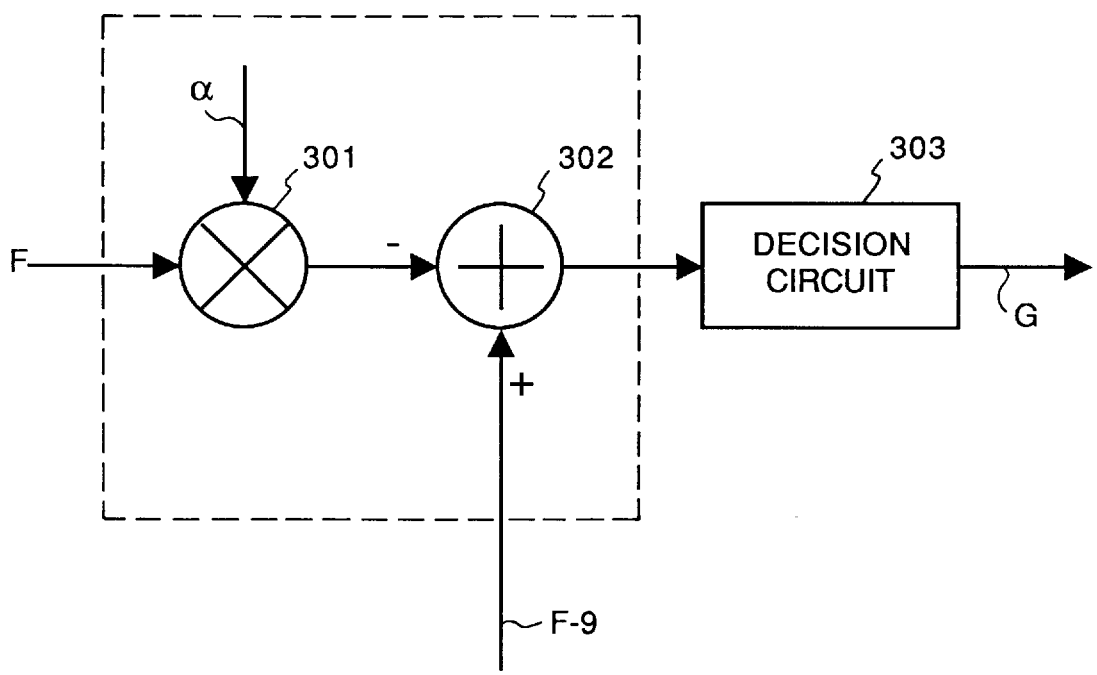
FIG. 27 is a block diagram showing the construction of a comparator/discriminator circuit according to the third embodiment.

Comparator/discriminator circuits 350~357 have two input signal lines, one or both of which is weighted, and function to discriminate the results of comparing inputs to the two lines. FIG. 27 is an example of a typical comparator/discriminator circuit. In FIG. 27, F signifies any one of the signal lines F-1~F-8 in FIGS. 25 and 26. A signal that has entered from the signal line F is multiplied by a weighting constant α in a weighting multiplier 301, and the signal on signal line F-9 is subtracted from the resulting product by an adder 302, which is for comparing signal size. The signal resulting from subtraction is inputted to a decision circuit 303, which outputs "1" to the signal line G if the value of this signal is positive and "0" if the value is negative. In other words, by selecting the constant α appropriately, the outputs of comparator/discriminator circuits comparing and discriminating the average output energies of two BPFs tuned to two different sine waves forming a DTMF signal currently being received can be made "1", and the outputs of comparator/discriminator circuits comparing and discriminating the average output energies of the six BPFs not tuned can be made "0". The block indicated by the dashed lines in FIG. 28 constructs a weighting comparator circuit.

The detection logic 360 to which the results of discrimination from the comparator/discriminator circuits 350~357 are inputted is similar to the detection logic 260 of the second embodiment and need not be described again.

Figure 28:
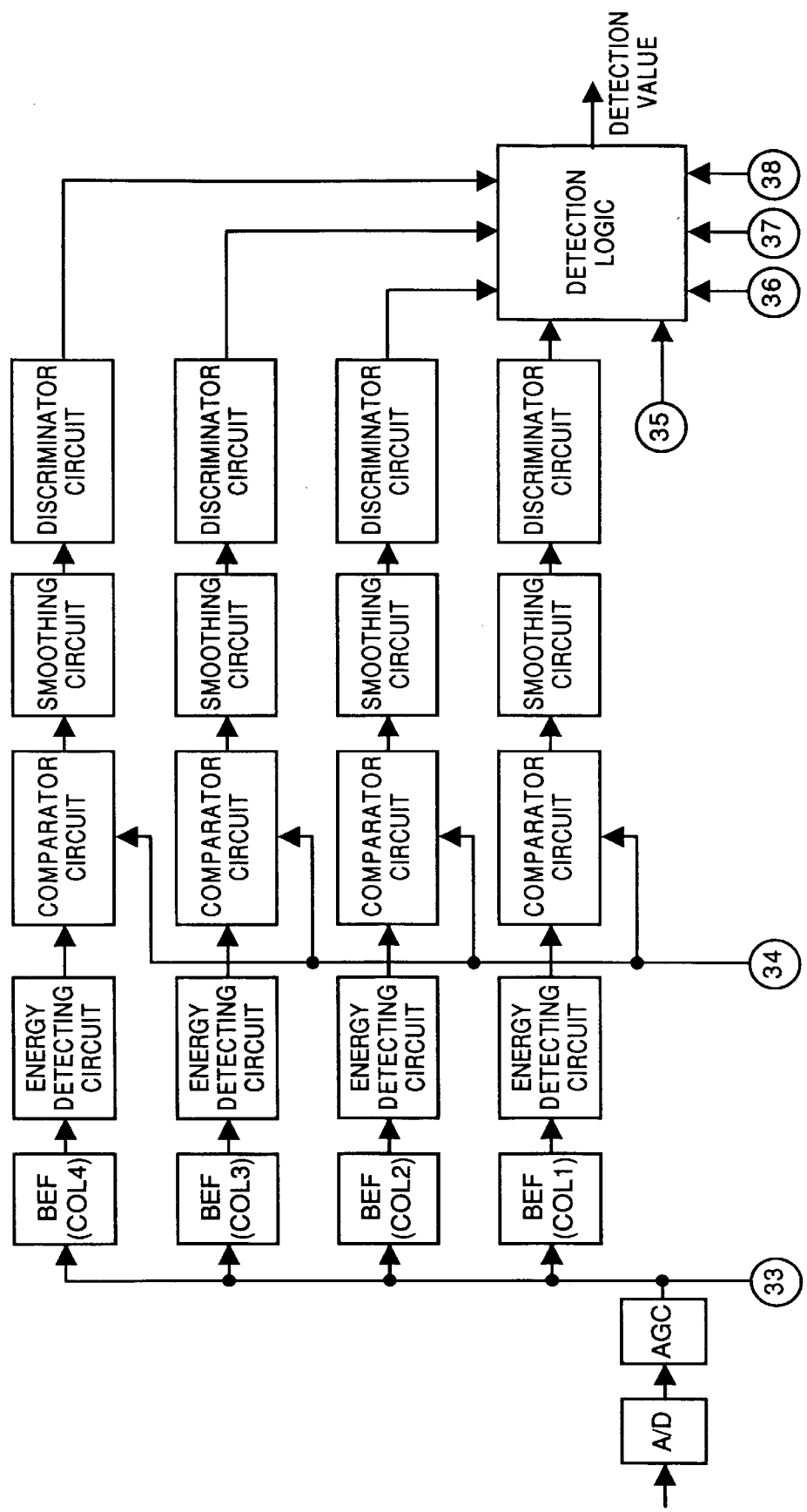
FIGS. 28 and 29 are block diagrams showing the circuitry of a DTMF detector according to a modification of the third embodiment.
Figure 29:
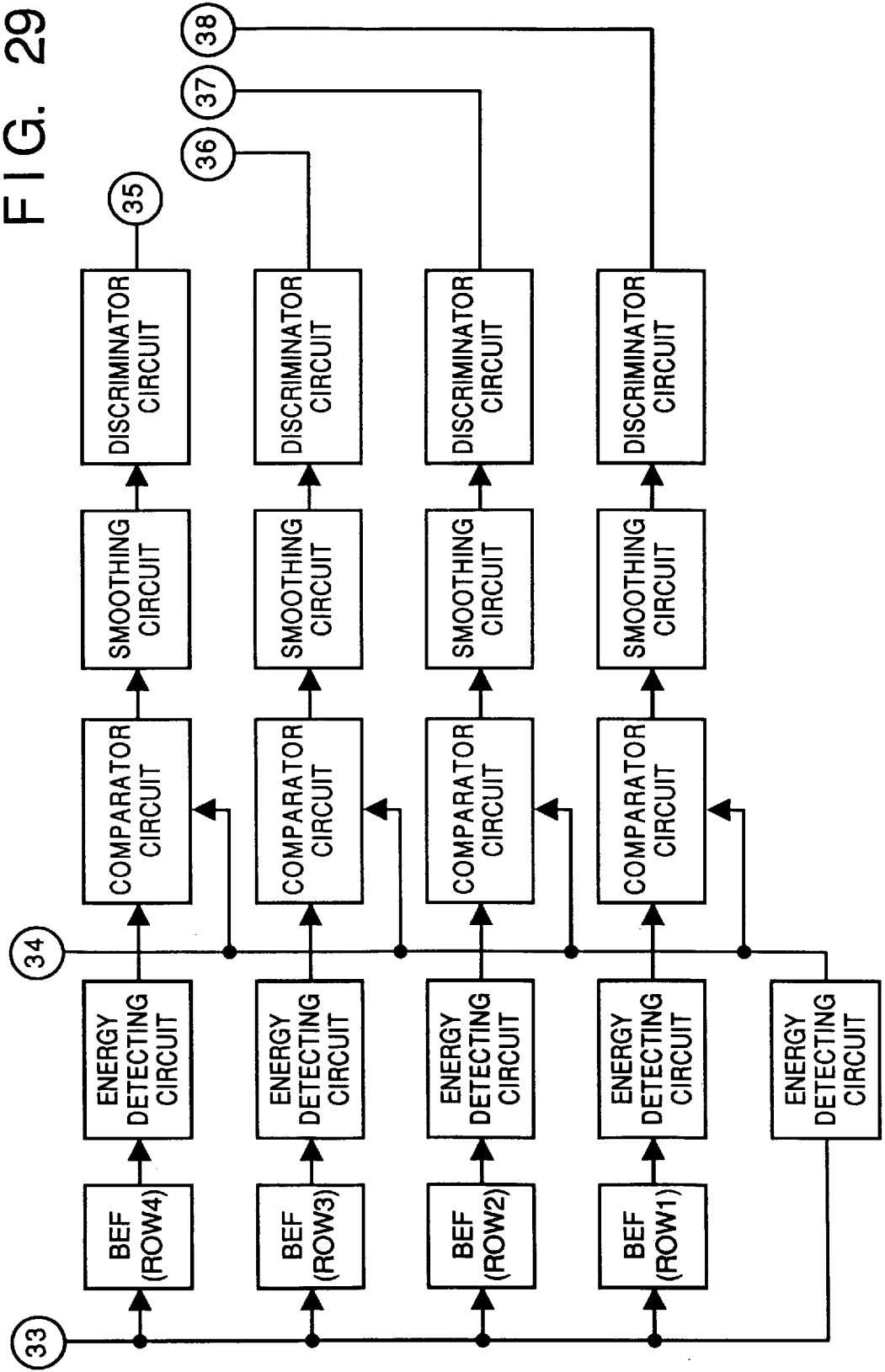

In the third embodiment, an arrangement is described in which the comparator/discriminator circuits are placed on the output sides of the smoothing circuits. However, this does not impose a limitation upon the invention. For example, as shown in FIGS. 28 and 29, it is easy to realize an arrangement in which the comparator circuits of the comparator/discriminator circuits are placed on the output sides of the energy detecting circuits while the discriminator circuits of the comparator/discriminator circuits are placed on the output sides of the smoothing circuits.

Thus, in accordance with the third embodiment, as described above, the DTMF can be detected in a shorter period of time and erroneous detection can be suppressed. These effects are obtained in addition to those of the second embodiment described earlier.

<Fourth Embodiment>

Figure 30:
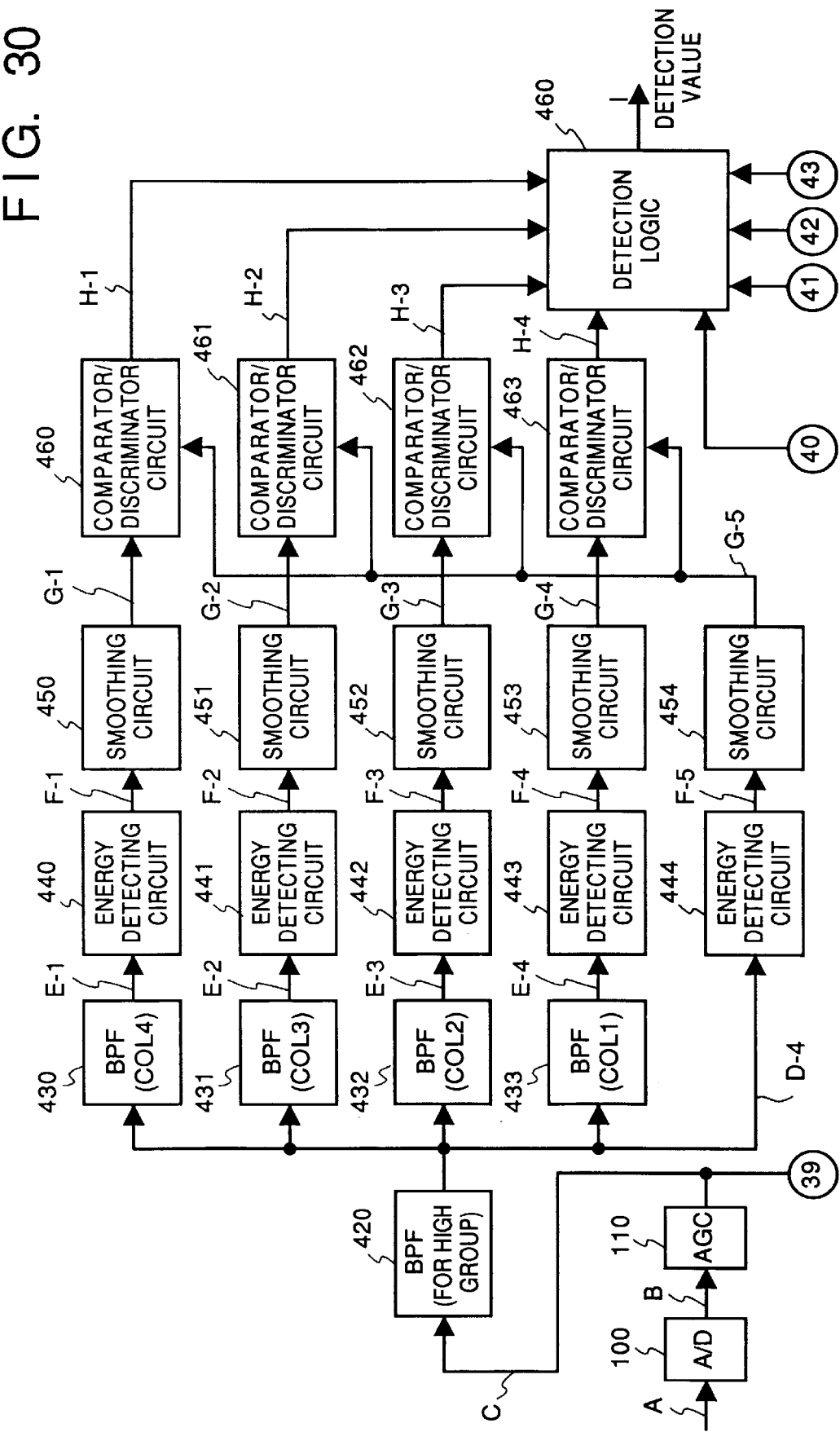
FIGS. 30 and 31 are block diagrams showing the circuitry of a DTMF detector according to a fourth embodiment of the invention.
Figure 31:
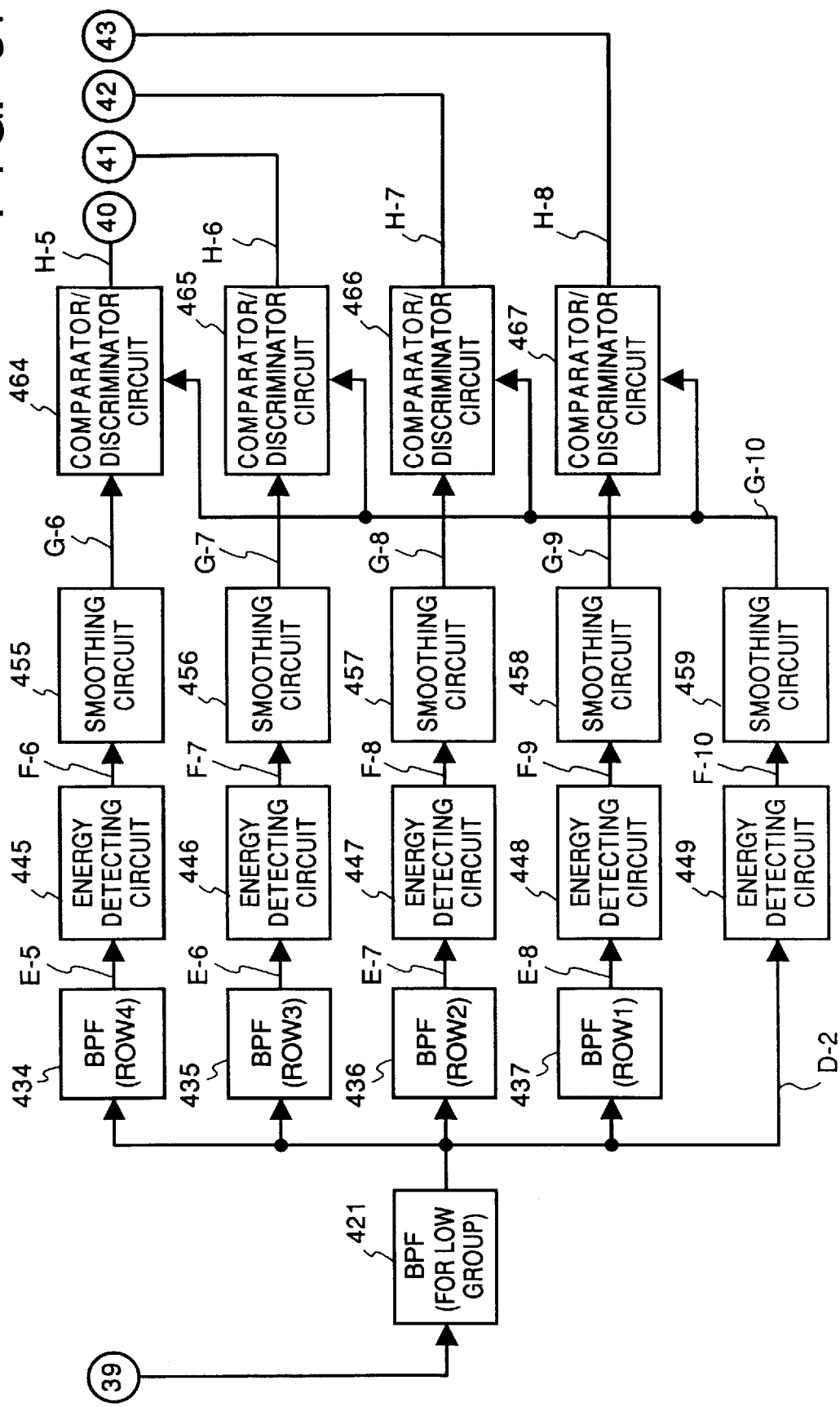

FIGS. 30 and 31 are diagrams illustrating the circuitry of a DTMF detector according to a fourth embodiment of the invention. In the fourth embodiment as illustrated, BPF 420 for the high group and a BPF 421 for the low group are provided in front of the BPFs of the second embodiment, and the average energy of all of the high group frequencies and the average energy of all of the low group frequencies are detected separately by energy detecting circuits 444 and 449, respectively. It should be noted that the circuits are similar those of the foregoing embodiments and a detailed described thereof is omitted.

In the arrangement described above, an analog DTMF signal that has arrived from the telephone line via the signal line A enters the A/D converter 100, where the signal is quantized. The resulting quantized DTMF signal is applied to the AGC 110 through the signal line B. The output of the AGC 110 is inputted simultaneously to the high-group BPF 420 and low-group BPF 421 by signal line C. The high-group BPF 420 passes a high-frequency band that includes the high group frequencies in the DTMF signal and eliminates line noise such as Gaussian noise and sine wave noise contained in the band of the low group frequencies. The low-group BPF 421 passes a low-frequency band that includes the low group frequencies in the DTMF signal and blocks the high-frequency band that contains the high group frequencies. Next, detection of the DTMF signal is carried out in a manner similar to that of each of the foregoing embodiments by BPFs 430~437, energy detecting circuits 440~449, smoothing circuits 450~459, comparator/discriminator circuits 460~467 and detection logic 470.

Figure 32:
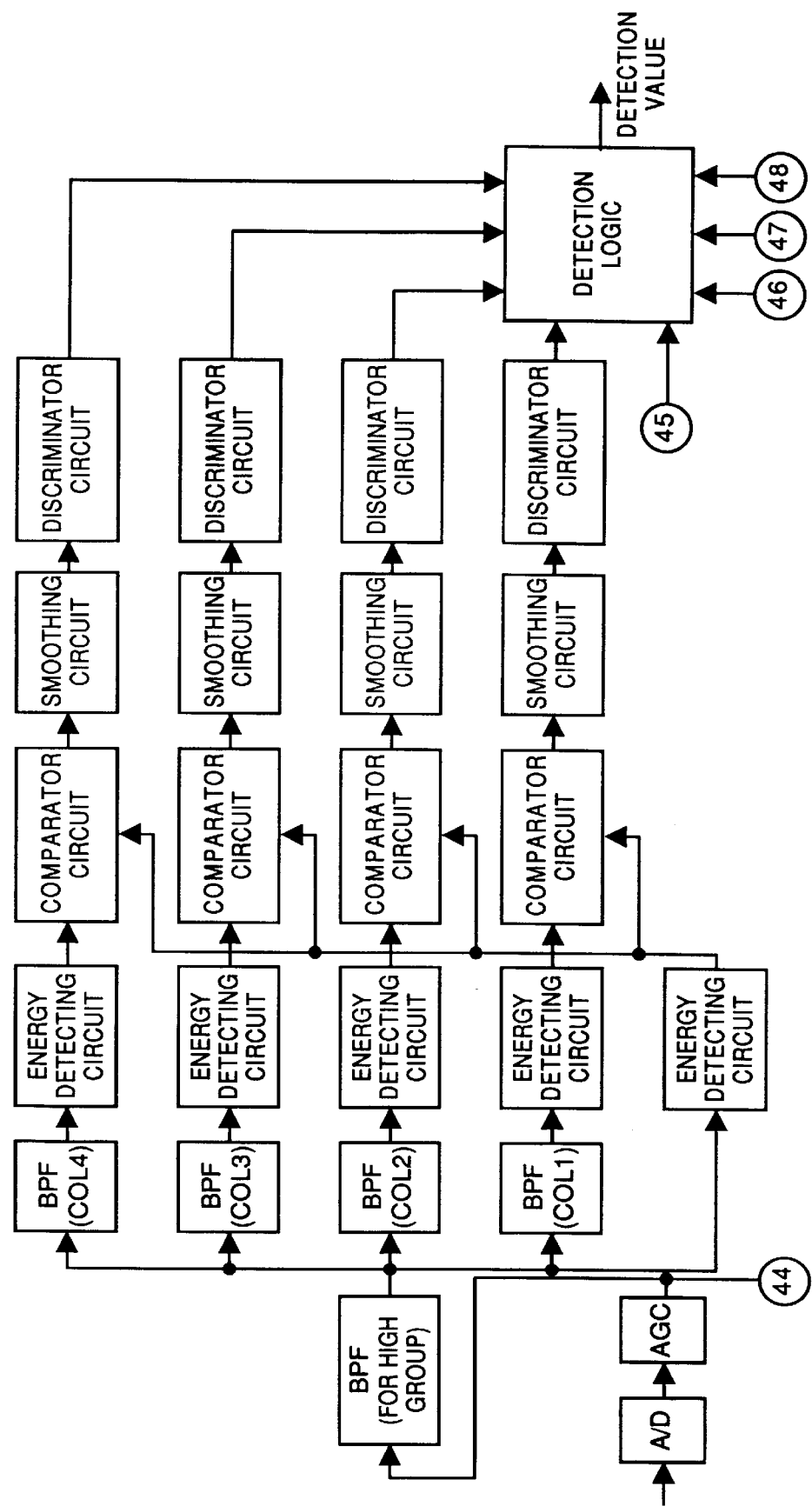
FIGS. 32 and 33 are block diagrams showing the circuitry of a DTMF detector according to a modification of the fourth embodiment.
Figure 33:
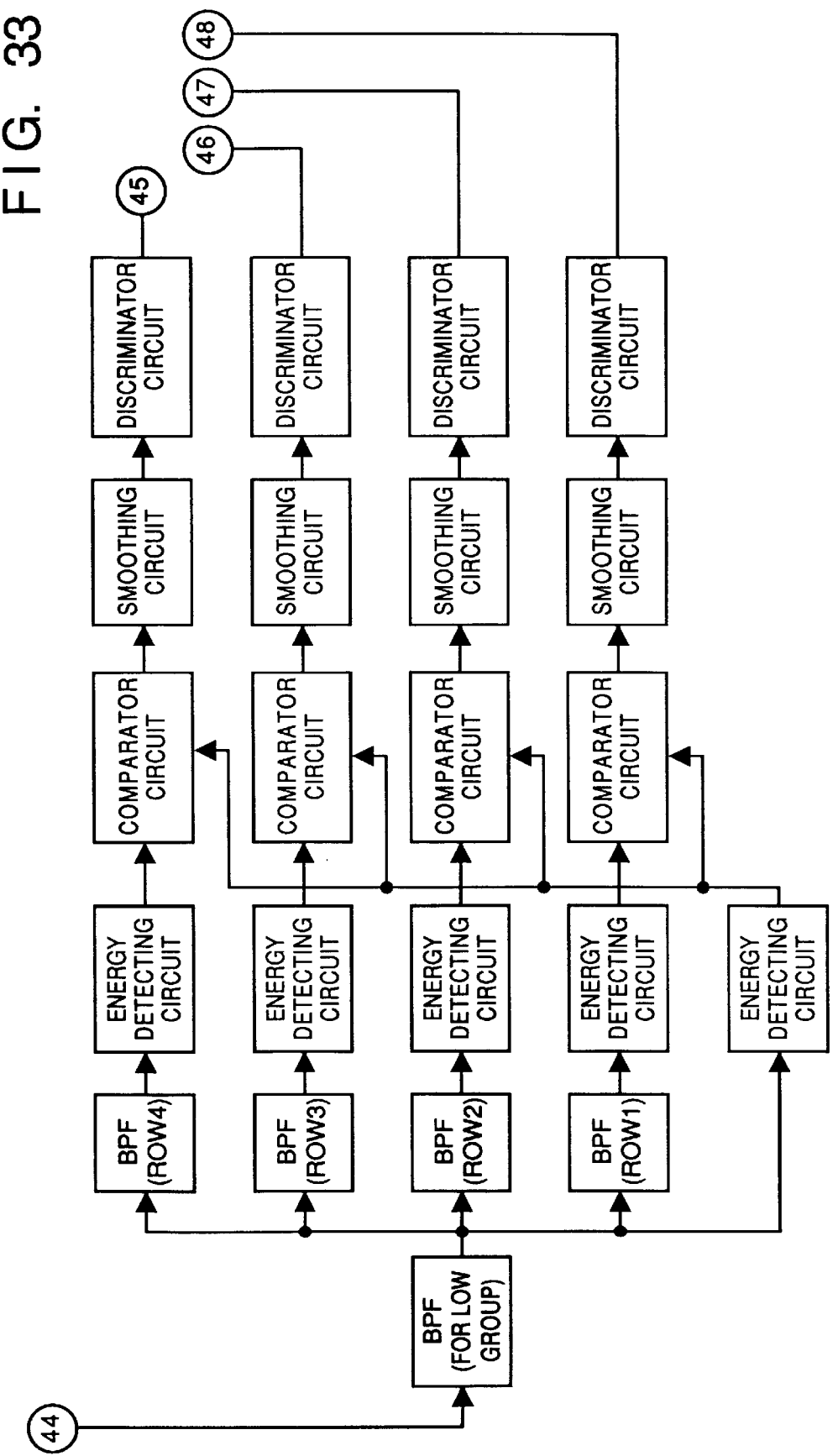

In the fourth embodiment, an arrangement is described in which the comparator/discriminator circuits are placed on the output sides of the smoothing circuits. However, this does not impose a limitation upon the invention. For example, as shown in FIGS. 32 and 33 it is easy to realize an arrangement in which the comparator circuits of the comparator/discriminator circuits are placed on the output sides of the energy detecting circuits while the discriminator circuits of the comparator/discriminator circuits are placed on the output sides of the smoothing circuits.

Thus, in accordance with the fourth embodiment, as described above, erroneous detection due to the influence of amplitude distortion caused by link distortion or distortion in the subscriber line. These effects are obtained in addition to those of the foregoing embodiment.

In the embodiment described above, a DTMF detector in which the AGC is realized by firmware is described as an example. However, this does not impose a limitation upon the invention, for a DTMF detector having the AGC placed in front of the A/D converter is easy to achieve.

The comparator/discriminator circuit shown in FIG. 3 is used in the present invention. However, as long as the smoothing circuit output and a reference threshold level are capable of being compared and discriminated, the same function can be implemented fully using any arrangement by making the corresponding changes in logic within the detection logic.

In the embodiments described above, the FAX control system 800 receives the DTMF signal detected by the detection logic 560 via the interface circuit 802, and performs control of the facsimile multiple-address communication and so on.

The present invention can be applied to a system constituted by a plurality of devices or to an apparatus comprising a single device. Furthermore, it goes without saying that the invention is applicable also to a case where the object of the invention is attained by supplying a program to a system or apparatus.

Thus, in accordance with the embodiments of the invention as described above, it is possible to provide a DTMF detector in which the detection of DTMF signals can be performed in a short period of time and erroneous detection of the DTMF signals can be suppressed.

As many apparently widely different embodiments of the present invention can be made without departing from the spirit and scope thereof, it is to be understood that the invention is not limited to the specific embodiments thereof except as defined in the appended claims.

What is claimed is:

1. A DTMF detecting apparatus in a DTMF transmission system in which information is transmitted using combinations of tone signals having two different frequencies with different frequency bands, comprising:

filter means for eliminating frequency bands for the tone signals from a reception signal;

first detecting means for detecting energy of the reception signal from which the frequency bands are eliminated by said filter means;

second detecting means for detecting energy of a frequency band different from the frequency bands for the tone signals; and third detecting means for detecting a DTMF signal based upon the difference between the energies detected by said first and second detecting means.

2. A DTMF detecting apparatus in a DTMF transmission system in which information is transmitted using combinations of tone signals having two different frequencies of a predetermined number of frequencies, comprising:

first detecting means for detecting total energy of an input signal;

a plurality of filtering means, each eliminates a different predetermined frequency band of the input signal, each frequency band corresponds to each DTMF signal frequencies; and second detecting means for detecting a DTMF signal based upon information indicative of the difference between each of energies of outputs from the plurality of filtering means and the total energy detecting by said first detecting means;

wherein said second detecting means detects one of the plurality of filtering means corresponding to low group of a DTMF signal, whose output energy is smaller than the others, and one of the plurality of filtering means corresponding to high group of a DTMF signal, whose output energy is smaller than the others.

3. A DTMF detecting apparatus in a DTMF transmission system in which information is transmitted using combinations of one of a plurality of first tone signals included in a high-frequency region and one of a plurality of second tone signals included in a low-frequency region, comprising:

first filter means for passing an input signal in the high-frequency region;

first detecting means for detecting total energy of an output signal of said first filter means;

second detecting means for detecting energy of the output signal of said first signal means at each frequency for the plurality of first tone signals;

second filter means for passing an input signal in the low-frequency region;

third detecting means for detecting total energy of an output signal of said second filter means;

fourth detecting means for detecting energy of the output signal of said second filter means at each frequency for the plurality of second tone signals; and fifth detecting means for detecting a DTMF signal based upon the energies detected by said first, second, third and fourth detecting means.

4. A DTMF detecting method in a DTMF transmission system in which information is transmitted using combinations of tone signals having two different frequencies having different frequency bands, comprising:

a filtering step of eliminating frequency bands for the tone signals from a reception signal;

a first detecting step of detecting energy of the reception signal from which the frequency bands are eliminated in said filtering step;

a second detecting step of detecting energy of a frequency band different from the frequency bands for the tone signals; and a third detecting step of detecting a DTMF signal based upon the difference between the energies detected at said first and second detecting steps.

5. A DTMF detecting method in a DTMF transmission system in which information is transmitted using combinations of tone signals having two different frequencies, comprising:

a first detecting step of detecting total energy of an input signal;

a filtering step of eliminating the input signal of a predetermined frequency band;

a repeating step of repeating said filtering step for different frequency bands, each of frequency bands corresponds to DTMF signal frequencies; and a second detecting step of detecting a DTMF signal based upon information indicative of the difference between energies of the eliminated signals and the total energy detected at said first detecting step, wherein, in said second detecting step, one of input signals eliminated frequency bands corresponding to low group of a DTMF signal, whose energy is smaller than the others, and one of input signals eliminated frequency bands corresponding to high group of a DTMF signal, whose energy is smaller than the others, are detected.

6. A DTMF detecting method in a DTMF transmission system in which information is transmitted using combinations of one of a plurality of first tone signals including in a high-frequency region and one of a plurality of second tone signals included in a low-frequency region, comprising:

a first detecting step of detecting total energy of an output signal of first filter means for passing an input signal in the high-frequency region;

a second detecting step of detecting energy of the output signal of said first filter means at each frequency for the plurality of first tone signals;

a third detecting step of detecting total energy of an output signal of second filter means for passing an input signal in the low-frequency region;

a fourth detecting step of detecting energy of the output signal of said second filter means at each frequency for the plurality of second tone signals; and a fifth detecting step of detecting a DTMF signal based upon the energies detected at said first, second, third and fourth detecting means.

7. A data communication apparatus comprising:

filter means for eliminating a frequency band for DTMF signal frequencies from a reception signal;

first detecting means for detecting energy of the reception signal from which the frequency bands are eliminated by said filter means;

second detecting means for detecting energy of a second frequency band, said second frequency band different from the frequency bands for the DTMF signal frequencies;

third detecting means for detecting a DTMF signal based upon the difference between the energies detected by said first and second detecting means; and control means for controlling a data communication based upon the DTMF signal.

8. A data communication apparatus comprising:

first detecting means for detecting total energy of an input signal;

a plurality of filtering means, each eliminates a different predetermined frequency band of the input signal, each frequency band corresponds to DTMF signal frequencies;

second detecting means for detecting a DTMF signal based upon information indicative of the difference between the each of energies of outputs from the plurality of filtering means and the total energy detected by said first detecting means; and control means for controlling a data communication based upon the DTMF signal;

wherein said second detecting means detects one of the plurality of filtering means corresponding to low group of a DTMF signal, whose output energy is smaller than the others, and one of the plurality of filtering means corresponding to high group of a DTMF signal, whose output energy is smaller than the others.

9. A data communication apparatus for communicating data using a DTMF signal consisting of combinations of a plurality of first tone signals included in a high-frequency region and a plurality of second tone signals included in a low-frequency region, comprising:

first filter means for passing an input signal in the high-frequency region;

first detecting means for detecting total energy of an output signal of said first filter means;

second detecting means for detecting energy of the output signal of said first filter means at each frequency for the plurality of first tone signals;

second filter means for passing an input signal in the low-frequency region;

third detecting means for detecting total energy of an output signal of said second filter means;

fourth detecting means for detecting energy of the output signal of said second filter means at each frequency for the plurality of second tone signals;

fifth detecting means for detecting a DTMF signal based upon the energies detected by said first, second, third and fourth detecting means; and control means for controlling a data communication based upon the DTMF signal.

10. A DTMF signal detecting apparatus comprising:

a plurality of filtering means, each eliminates a different predetermined frequency band of the input signal, each frequency band corresponds to DTMF signal frequencies;

detecting means for detecting energy of a frequency band different from the frequency bands corresponding to DTMF signal frequencies; and comparing means for comparing the energy detected by said detecting means with each of the eliminated input signals from the plurality of filtering means;

wherein the DTMF signal detection logic detects one of the plurality of filtering means corresponding to low group of a DTMF signal, whose output energy is smaller than the others, and one of the plurality of filtering means corresponding to high group of a DTMF signal, whose output energy is smaller than the others.

11. A data communication apparatus comprising:

a plurality of filtering means, each eliminates a different predetermined frequency band of the input signal, each frequency band corresponds to DTMF signal frequencies;

first detecting means for detecting energy of a frequency band different from the frequency bands corresponding to DTMF signal frequencies; and second detecting means for detecting difference between the energy detected by said first detecting means and each of the eliminated input signals which is outputted from the plurality of filtering means, wherein, said second detecting means detects one of the plurality of filtering means corresponding to low group of a DTMF signal, whose output energy is smaller than the others, and one of the plurality of filtering means corresponding to high group of a DTMF signal, whose output energy is smaller than the others.

12. A detecting apparatus for a DTMF communication system in which information is transmitted using a tone signal, comprising:

filter means for eliminating a frequency band for the tone signal from a reception signal;

first detecting means for detecting the reception signal from which the frequency bands are eliminated by said filter means;

second detecting means for detecting a second frequency band, said second frequency band different from the frequency band for the tone signal; and third detecting means for detecting the tone signal based on the difference between the detection results by said first and second detecting means.

13. The apparatus according to claim 12, wherein said second detecting means detects the frequency band wider than the frequency band for the tone signal.

14. A detecting method in a DTMF communication system in which information is transmitted using a tone signal, comprising:

a filtering step of eliminating a frequency band for the tone signal from a reception signal;

a first detecting step of detecting the reception signal from which the frequency bands are eliminated in said filtering step;

a second detecting step of detecting a second frequency band, said second frequency band different from the frequency band for the tone signal; and a third detecting step of detecting the tone signal based on the difference between the detection results in said first and second detecting step.

15. The method according to claim 14, wherein said second detecting step detects the frequency band wider than the frequency band for the tone signal.

16. A data communication apparatus for a DTMF communication system in which information is transmitted using a tone signal, comprising:

filter means for eliminating a frequency band for the tone signal from a reception signal;

first detecting means for detecting the reception signal from which the frequency bands are eliminated by said filter means;

second detecting means for detecting a second frequency band, said second frequency different from the frequency band for the tone signal;

third detecting means for detecting the tone signal based on the difference between the detection results by said first and second detecting means; and control means for controlling a data communication based upon the tone signal detected by said third detecting means.

17. The apparatus according to claim 16, wherein said second detecting means detects the frequency band wider than the frequency band for the tone signal.

* * * * *

UNITED STATES PATENT AND TRADEMARK OFFICE
CERTIFICATE OF CORRECTION

PATENT NO. : 5,818,929
DATED : October 6, 1998
INVENTOR(S) : Tatsuya Yaguchi

It is certified that error appears in the above-identified patent and that said Letters Patent is hereby corrected as shown below:

Column 3, line 3, delete "diagram s" and insert therefore -- diagrams --.

Column 6, line 35, delete "tp" and insert therefor -- to --.

In the Claims:

Claim 3, Col. 13, line 6" delete "first signal means" and insert therefor -- first filter means --.

Signed and Sealed this

Second Day of February, 1999

Attest:

Attesting Officer

*Acting Commissioner of Patents and Trademarks*